US012798582B2

(12) United States Patent
Zhang

(10) Patent No.: US 12,798,582 B2
(45) Date of Patent: Nov. 17, 2026

(54) METHOD, ELECTRONIC DEVICE, AND STORAGE MEDIUM FOR DISPLAYING VEHICLE DRIVING STATE

(71) Applicant: TENCENT TECHNOLOGY (SHENZHEN) COMPANY LIMITED, Shenzhen (CN)

(72) Inventor: Honglong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 143 days.

(21) Appl. No.: 18/590,516

(22) Filed: Feb. 28, 2024

(65) Prior Publication Data

US 2024/0199026 A1 Jun. 20, 2024

Related U.S. Application Data

(63) Continuation of application No. PCT/CN2023/120285, filed on Sep. 21, 2023.

(30) Foreign Application Priority Data

Oct. 25, 2022 (CN) ......................... 202211310360.2

(51) Int. Cl.
*B60K 35/00* (2024.01)
*B60K 35/22* (2024.01)
(Continued)

(52) U.S. Cl.
CPC ...... *B60W 30/18163* (2013.01); *B60W 50/14* (2013.01); *B60W 2050/146* (2013.01); *B60W 2400/00* (2013.01)

(58) Field of Classification Search
CPC ........ B60K 35/22; B60K 35/28; B60K 35/29; B60K 35/00; B60W 30/18163;
(Continued)

(56) References Cited

U.S. PATENT DOCUMENTS

2007/0229310 A1* 10/2007 Sato ...................... B60W 50/14 340/995.1
2016/0231743 A1* 8/2016 Bendewald ............ B60K 35/60
(Continued)

FOREIGN PATENT DOCUMENTS

CN 110406530 A 11/2019
CN 113359709 A 9/2021
(Continued)

OTHER PUBLICATIONS

The World Intellectual Property Organization (WIPO) International Search Report for PCT/CN2023/120285 Dec. 26, 2023 6 Pages (including translation).
(Continued)

*Primary Examiner* — Hossam M Abd El Latif
(74) *Attorney, Agent, or Firm* — ANOVA LAW GROUP, PLLC

(57) ABSTRACT

A method for displaying vehicle driving state is performed by an electronic device and includes obtaining a vehicle driving state of a current vehicle, and obtaining environment sensing information related to a current driving scene of the current vehicle, the environment sensing information including a scene image of the current driving scene; performing lane line detection on the scene image to obtain lane information in the current driving scene; generating a driving-state prompt element corresponding to the vehicle driving state based on the lane information, and performing superposed fusion on the driving-state prompt element and the environment sensing information to render and generate an augmented reality map; and displaying the augmented reality map.

20 Claims, 24 Drawing Sheets

(51) Int. Cl.

| | |
|---|---|
| ***B60K 35/28*** | (2024.01) |
| ***B60W 30/18*** | (2012.01) |
| ***B60W 40/02*** | (2006.01) |
| ***B60W 50/14*** | (2020.01) |
| ***G01C 21/00*** | (2006.01) |
| ***G01C 21/36*** | (2006.01) |
| ***G06F 16/29*** | (2019.01) |
| ***G06T 19/00*** | (2011.01) |

(58) Field of Classification Search
CPC ........... B60W 50/14; B60W 2050/146; B60W 2400/00; B60W 40/02; B60W 2556/35; B60W 2556/40; G01C 21/00; G01C 21/3658; G01C 21/38; G06F 16/29; G06T 7/73; G06T 19/00; G06T 19/006; G06T 19/003; G06V 20/56; G06V 20/588
USPC ............................................................ 701/23
See application file for complete search history.

(56) References Cited

U.S. PATENT DOCUMENTS

| | | | | |
|---|---|---|---|---|
| 2019/0077504 | A1 | 3/2019 | Chapman et al. | |
| 2020/0307594 | A1* | 10/2020 | Kato | B60W 60/0059 |
| 2021/0207971 | A1* | 7/2021 | Kim | G06V 20/58 |
| 2022/0212690 | A1* | 7/2022 | Zheng | B60K 35/10 |
| 2022/0289228 | A1 | 9/2022 | Yamamoto et al. | |
| 2023/0106673 | A1* | 4/2023 | Asghar | A61B 5/02055 382/104 |
| 2023/0391193 | A1* | 12/2023 | Huang | B60W 60/005 |
| 2023/0398995 | A1 | 12/2023 | Liu et al. | |
| 2025/0155258 | A1* | 5/2025 | Komatsu | G01C 21/365 |

FOREIGN PATENT DOCUMENTS

| | | | |
|---|---|---|---|
| CN | 113460085 | A | 10/2021 |
| CN | 114577233 | A | 6/2022 |
| CN | 115027495 | A | 9/2022 |
| CN | 115123303 | A | 9/2022 |
| CN | 115140055 | A | 10/2022 |
| CN | 117184115 | A | 12/2023 |

OTHER PUBLICATIONS

The European Patent Office (EPO) the Extended European Search Report for Application No. 23874057.5, Jan. 13, 2025 11 Pages.

* cited by examiner

METHOD, ELECTRONIC DEVICE, AND STORAGE MEDIUM FOR DISPLAYING VEHICLE DRIVING STATE

CROSS-REFERENCES TO RELATED APPLICATIONS

This application is a continuation application of PCT Patent Application No. PCT/CN2023/120285, filed on Sep. 21, 2023, which claims priority to Chinese Patent Application No. 202211310360.2, filed on Oct. 25, 2022, which is incorporated by reference in its entirety.

FIELD OF THE TECHNOLOGY

The present disclosure relates to the field of computer technologies and, in particular, to a display technology of a vehicle driving state.

BACKGROUND OF THE DISCLOSURE

The automated driving technology is currently at a high-speed development stage, and cars with the automated driving functions are increasingly favored by consumers. Therefore, automated driving systems have been adopted on various vehicle models in order to increase their market competitiveness. As part of the automated driving system, a high-precision map also enters the consumers' field of view. In addition, a car with an intelligent cockpit may provide the consumers with ultimate real-time experiences.

The automated driving systems often rely on high-precision map data for navigation. However, the high-precision map data requires high costs, large data volume, and high consumption of a storage resource, a computing resource, and/or a network resource.

SUMMARY

One embodiment of the present disclosure provides a method for displaying vehicle driving state, performed by an electronic device. The method includes obtaining a vehicle driving state of a current vehicle, and obtaining environment sensing information related to a current driving scene of the current vehicle, the environment sensing information comprising a scene image of the current driving scene; performing lane line detection on the scene image to obtain lane information in the current driving scene; generating a driving-state prompt element corresponding to the vehicle driving state based on the lane information, and performing superposed fusion on the driving-state prompt element and the environment sensing information to render and generate an augmented reality map; and displaying the augmented reality map.

Another embodiment of the present disclosure provides an electronic device. The electronic device includes one or more processors and a memory, the memory storing a computer program that, when being executed, causes the one or more processors to perform: obtaining a vehicle driving state of a current vehicle, and obtaining environment sensing information related to a current driving scene of the current vehicle, the environment sensing information comprising a scene image of the current driving scene; performing lane line detection on the scene image to obtain lane information in the current driving scene; generating a driving-state prompt element corresponding to the vehicle driving state based on the lane information, and performing superposed fusion on the driving-state prompt element and the environment sensing information to render and generate an augmented reality map; and displaying the augmented reality map.

Another embodiment of the present disclosure provides a non-transitory computer readable storage medium, including a computer program that, when being executed, causes an electronic device to perform: obtaining a vehicle driving state of a current vehicle, and obtaining environment sensing information related to a current driving scene of the current vehicle, the environment sensing information comprising a scene image of the current driving scene; performing lane line detection on the scene image to obtain lane information in the current driving scene; generating a driving-state prompt element corresponding to the vehicle driving state based on the lane information, and performing superposed fusion on the driving-state prompt element and the environment sensing information to render and generate an augmented reality map; and displaying the augmented reality map.

BRIEF DESCRIPTION OF THE DRAWINGS

The accompanying drawings described herein are used for providing a further understanding of the present disclosure, and form part of the present disclosure. Exemplary embodiments of the present disclosure and descriptions thereof are used for explaining the present disclosure, and do not constitute any inappropriate limitation to the present disclosure. In the accompanying drawings.

DESCRIPTION OF EMBODIMENTS

Figure 1:
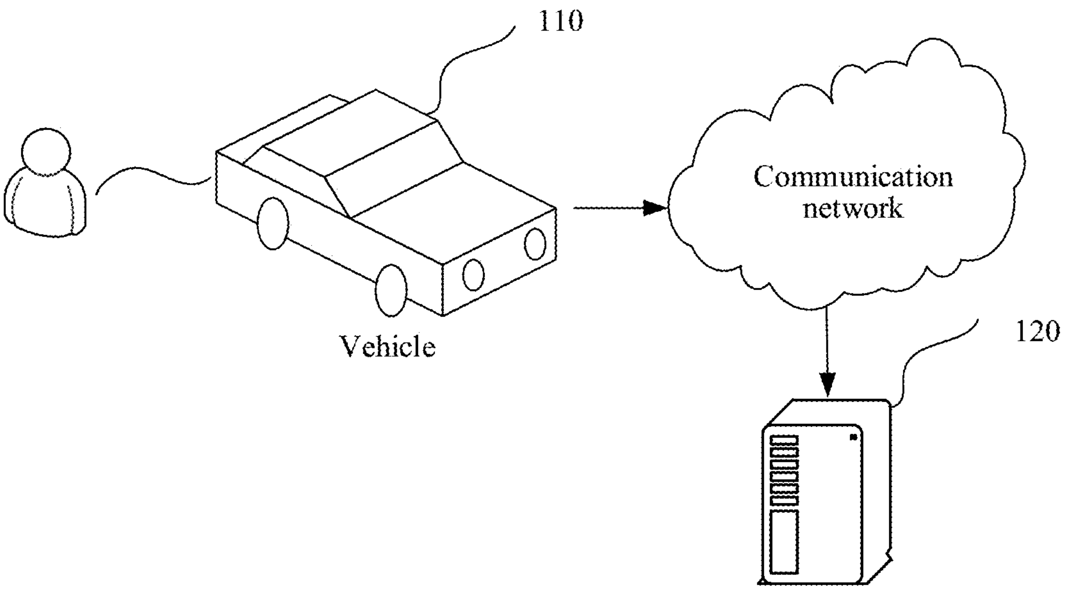
FIG. 1 is an exemplary schematic diagram of an application scenario according to an embodiment of the present disclosure.

In order to make objectives, technical solutions, and advantages of embodiments of the present disclosure clearer, the technical solutions of the present disclosure will be clearly and completely described in the following with reference to the accompanying drawings in the embodiments of the present disclosure. It is clear that the embodiments to be described are only a part rather than all of the embodiments of the technical solutions in the present disclosure. All other embodiments obtained by a person of ordinary skill in the art based on the embodiments recorded in the present disclosure without making creative efforts shall fall within the protection scope of the technical solutions in the present disclosure.

The following describes some concepts involved in the embodiments of the present disclosure.

Vehicle driving state: refers to a status in which an object drives a vehicle, which is divided into a manual driving state and an automated driving state. Manual driving means that a vehicle can be driven only by manual intervention, and automated driving means that a surrounding environment can be automatically sensed and responded to, and the vehicle can be driven without manual intervention. Automated driving may be further divided into many states, for example, a first automated driving state, a second automated driving state, and a third automated driving state that are listed in the embodiments of the present disclosure.

Adaptive cruise control (ACC): refers to a function/automated driving state that is provided by an automated driving system to dynamically adjust a speed of an ego vehicle according to a safe distance between a cruise speed set by an object and a front vehicle. When the front vehicle accelerates, the ego vehicle also accelerates to a set speed. When the front vehicle decelerates, the ego vehicle slows down to keep the safe distance from the front vehicle.

Lane center control (LCC): refers to a function/automated driving state provided by an automated driving system for assisting a driver in controlling a steering wheel, and can keep a vehicle centered in a current lane.

Navigate on autopilot (NOA): This function/automated driving state can guide a vehicle to drive automatically by setting a destination. Under supervision of a driver, the vehicle can complete operations such as lane change and overtaking, driving in automatically, and driving out of a ramp. Driving behaviors of the NOA are as follows: cruise, car following, avoidance, giving way, single rule-based lane change behavior planning (for example, merge into a fast traffic lane or exit as expected), and multi-condition decision-making lane change behavior (lane change during cruise).

Driving-state prompt element: matches a vehicle driving state, so that an object can intuitively learn of prompt information, is used for prompting a current driving state of the object, and may be an element related to a guide line, a guide area (that is, a guide plane), a guide point, or the like. For example, in the present disclosure, a lane line area is corresponding to one or more guide lines, a landing point area is corresponding to one guide point, a drivable lane plane is corresponding to one guide area, and the like.

Automated driving domain: is a set of software and hardware that are in a vehicle and specifically control automated driving.

Cockpit domain: is a set of software and hardware in a vehicle, such as a center console screen, a dashboard screen, and an operation button that are specially used for interacting with an object in a cockpit. In the present disclosure, the cockpit domain specially refers to a map interactive display part on the center console screen in the cockpit.

Vehicle Ethernet: is a new local area network technology that relies on networks to connect electronic units in vehicles. It can implement 100 Mbit/s on single pair of unshielded twisted pairs. It also meets requirements of the automotive industry for high reliability, low electromagnetic radiation, low power consumption, and low delay.

Carrier phase differential technology (Real Time Kinematic, RTK) device: It provides high-precision (centimeter level) positioning data in real time.

Maneuver point: is a location, in map navigation, that guides a driver to make a maneuver action such as steering, slowing down, lane merging, and driving out. It is usually a location of intersection turning, intersection diverting, and intersection merging.

Vehicle landing point: is a location of an ego vehicle when an automated driving system completes automatic lane change.

The present disclosure relates to a vehicle navigation technology in an intelligent traffic system (ITS). The ITS, also referred to as an intelligent transportation system, effectively integrates advanced science and technologies (for example, an information technology, a computer technology, a data communication technology, a sensor technology, an electronic control technology, an automatic control theory, operational research, and artificial intelligence) into transportation, service control, and vehicle manufacturing, and strengthens a relationship among a vehicle, a road, and a user, forming an integrated transport system that ensures safety, improves efficiency, improves environment, and saves energy.

The vehicle navigation technology is a technology in which a real-time location relationship between a vehicle and a road is mapped to a visual navigation interface based on positioning data provided by a satellite positioning system, providing a navigation function for a vehicle associated object (for example, a vehicle driving object or a vehicle riding object) in a driving process of the vehicle from a start point to an end point. In addition, by using the visual navigation interface, the vehicle associated object can learn of a vehicle driving state, and may further learn of information such as a current location of the vehicle, a driving route of the vehicle, a speed of the vehicle, and a road condition in front of the vehicle.

The following briefly describes a design idea of the embodiments of the present disclosure.

With rapid development of computer technologies, vehicle navigation technologies are widely used in daily life. Currently, in a vehicle navigation process, a visual navigation interface is presented to a vehicle associated object (for example, a vehicle driving object or a vehicle riding object). Related driving information of a vehicle may be learned of by using the vehicle associated object on the navigation interface.

In a related automated driving technology, when high-precision map data is relied on, a data amount required is relatively high, and consumption of a storage resource, a computing resource, and a network resource is relatively high. However, when the automated driving state is presented only from a perspective of a map, a multi-aspect fusion manner is not considered, a pure virtual form is used for presenting a related navigation map, a vehicle driving state is presented, and a correlation between a real environment and the driving state is ignored. Alternatively, rendering is performed only from a purely perceptual perspective, an intuitive degree of a rendering result needs to be improved, and a user has relatively high understanding cost and relatively poor experience.

Embodiments of the present disclosure provide method, apparatus, electronic device, and storage medium for displaying vehicle driving state. In the present disclosure, high-precision map data is discarded, and only a vehicle driving state and related environment sensing information need to be obtained. Based on the two types of information, an augmented reality map is rendered, thereby implementing lightweight drawing, reducing performance consumption, and improving drawing efficiency. In addition, in this process, the environment sensing information is used as a fusion basis, and a scene image of a real scene and the vehicle driving state are fused by using an augmented reality technology, presenting a mapping result of sensing data and the real world, which reflects a correlation between a real environment and the driving state. In addition, in the present disclosure, the generated augmented reality map is displayed, and an automated driving behavior can be displayed in multiple dimensions for associated objects of the vehicle to view separately.

The following describes preferred embodiments of the present disclosure with reference to the accompanying drawings of this specification. It is to be understood that the preferred embodiments described herein are merely used for describing and explaining the present disclosure, and are not used for limiting the present disclosure. In addition, in a case of no conflict, features in the embodiments and the embodiments of the present disclosure may be mutually combined.

FIG. 1 is a schematic diagram of an application scenario of an embodiment of the present disclosure. The application scenario diagram includes a terminal device 110 and a server 120.

In this embodiment of the present disclosure, the terminal device 110 includes but is not limited to a device such as a mobile phone, a tablet computer, a notebook computer, a desktop computer, an e-book reader, an intelligent voice interaction device, a smart home appliance, and an in-vehicle terminal. The terminal device in FIG. 1 uses an in-vehicle terminal as an example. A client related to display of a vehicle driving state may be installed on the terminal device. The client may be software (for example, a browser or map software), a web page or a mini program. The server 120 is a background server corresponding to software, a web page, or a mini program, or a server related to display of the vehicle driving state. This is not specifically limited in the present disclosure. The server 120 may be an independent physical server, or may be a server cluster or a distributed system formed by multiple physical servers, or may be a cloud server that provides basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The method for displaying vehicle driving state in the embodiments of the present disclosure may be performed by an electronic device. The electronic device may be the terminal device 110 or the server 120. That is, the method may be separately performed by the terminal device 110 or the server 120, or may be jointly performed by the terminal device 110 and the server 120. For example, when the method is jointly performed by the terminal device 110 and the server 120, the terminal device 110 (for example, an in-vehicle terminal located on a vehicle) first obtains a vehicle driving state of a current vehicle and environment sensing information related to a current driving scene of the current vehicle, where the environment sensing information includes a scene image of the current driving scene. The terminal device 110 may send the scene image to the server 120, and further, the server 120 performs lane line detection on the scene image to obtain lane information in the current driving scene. Then, the server 120 may notify the terminal device 110 of the obtained lane information, and the terminal device 110 generates a driving-state prompt element corresponding to the vehicle driving state based on the lane information, and renders and generates an augmented reality map by performing superposed fusion on the driving-state prompt element and the environment sensing information. Finally, the augmented reality map is displayed.

In an embodiment, the terminal device 110 may communicate with the server 120 by using a communication network.

In an embodiment, the communication network is a wired network or a wireless network.

FIG. 1 shows only an example for description. Actually, a quantity of terminal devices and a quantity of servers are not limited, and are not specifically limited in this embodiment of the present disclosure.

In this embodiment of the present disclosure, when there are multiple servers, the multiple servers may form a blockchain, and the server is a node on the blockchain. For the vehicle driving state display method disclosed in the embodiments of the present disclosure, data related to display of the vehicle driving state may be stored in a blockchain, for example, the vehicle driving state, the environment sensing information, the lane information, the driving-state prompt element, and the augmented reality map.

In addition, the embodiments of the present disclosure may be applied to various scenarios, including not only an automated driving scene, but also a scenario such as a cloud technology, artificial intelligence, smart transport, and aided driving.

The following describes, with reference to the foregoing described application scenario, the vehicle driving state display method provided in the exemplary implementation of the present disclosure with reference to the accompanying drawings. The foregoing application scenario is merely shown for case of understanding the spirit and principle of the present disclosure, and the implementation of the present disclosure is not limited in this aspect.

Figure 2:
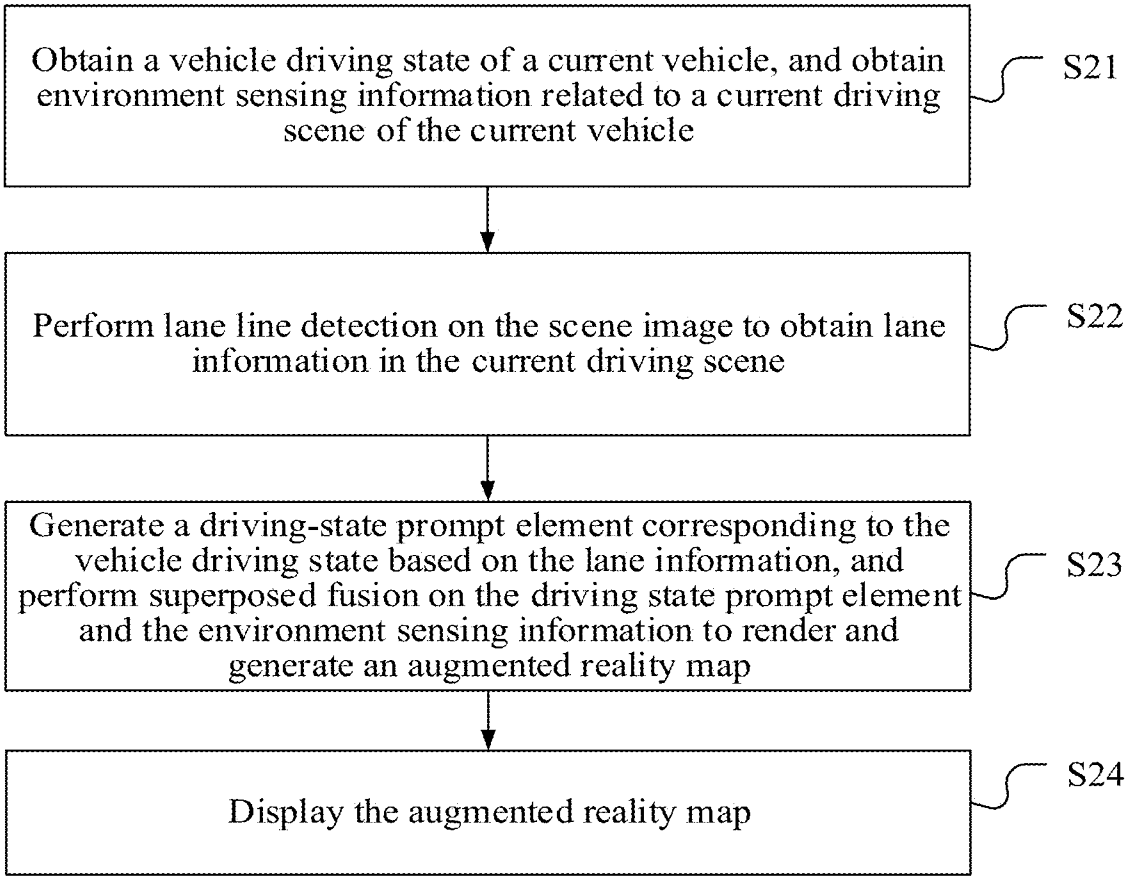
FIG. 2 is a schematic flowchart of an implementation of a method for displaying vehicle driving state according to an embodiment of the present disclosure.

FIG. 2 is an implementation flowchart of a vehicle driving state display method according to an embodiment of the present disclosure. A terminal device (such as an in-vehicle terminal) being an execution body is used as an example. A specific implementation procedure of the method is as follows:

S21: Obtain a vehicle driving state of a current vehicle, and obtain environment sensing information related to a current driving scene of the current vehicle.

The vehicle driving state may represent whether the current vehicle is currently in a manual driving state or in an automated driving state. The environment sensing information may be environment-related information of the current driving scene in which the current vehicle is located, and may include a scene image of the current driving scene.

In one embodiment, the vehicle driving state may be obtained from an automated driving domain through cross-domain communication between a driving domain of the current vehicle and the automated driving domain of the current vehicle.

The cockpit domain and the automated driving domain are two relatively independent processing systems. Data cross-domain transmission may be performed between the two systems based on a data transmission protocol such as an in-vehicle Ethernet by using a Transmission Control Protocol (TCP), a User Datagram Protocol (UDP), and a Scalable service-Oriented MiddlewarE over IP (SOME/IP) protocol.

In one embodiment, the environment sensing information may alternatively be obtained from the automated driving domain through cross-domain communication between the driving domain and the automated driving domain.

In this embodiment of the present disclosure, the automated driving domain includes an environment sensing device, and a quantity of the environment sensing devices may be one or more. This is not limited in this embodiment of the present disclosure. The environment sensing information may be obtained by using these environment sensing devices, that is, the environment of the current driving scene of the current vehicle is sensed by using the environment sensing devices.

For example, the environment sensing device may include but is not limited to: an RTK positioning device loaded on an automated driving system, a visual sensing device (such as an image collector), a radar sensing device (such as a laser radar and an ultrasonic radar), an infrared detector, a pressure sensor, and the like.

Figure 3A:
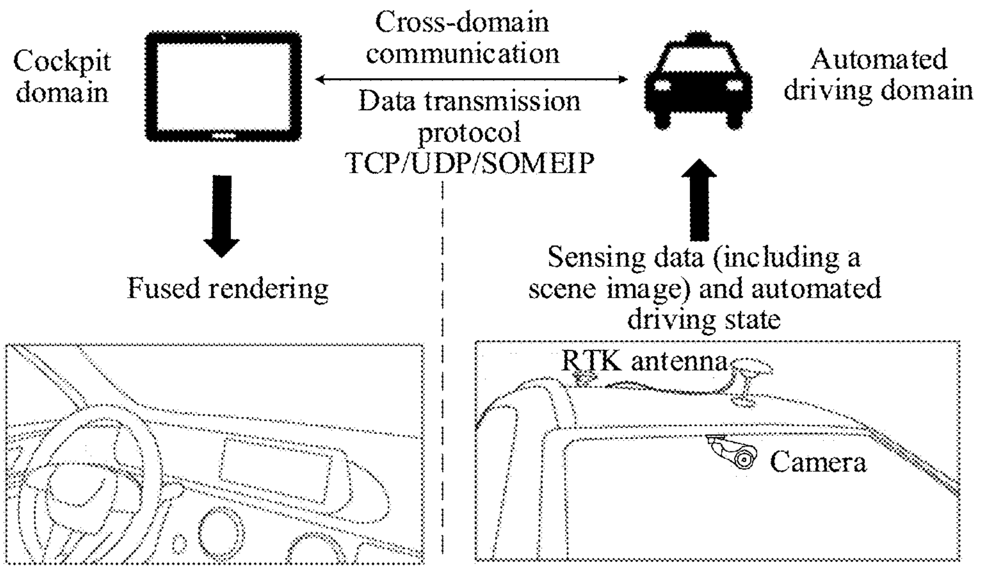
FIG. 3A is a schematic diagram of an automated driving data processing procedure according to an embodiment of the present disclosure.
Figure 4:
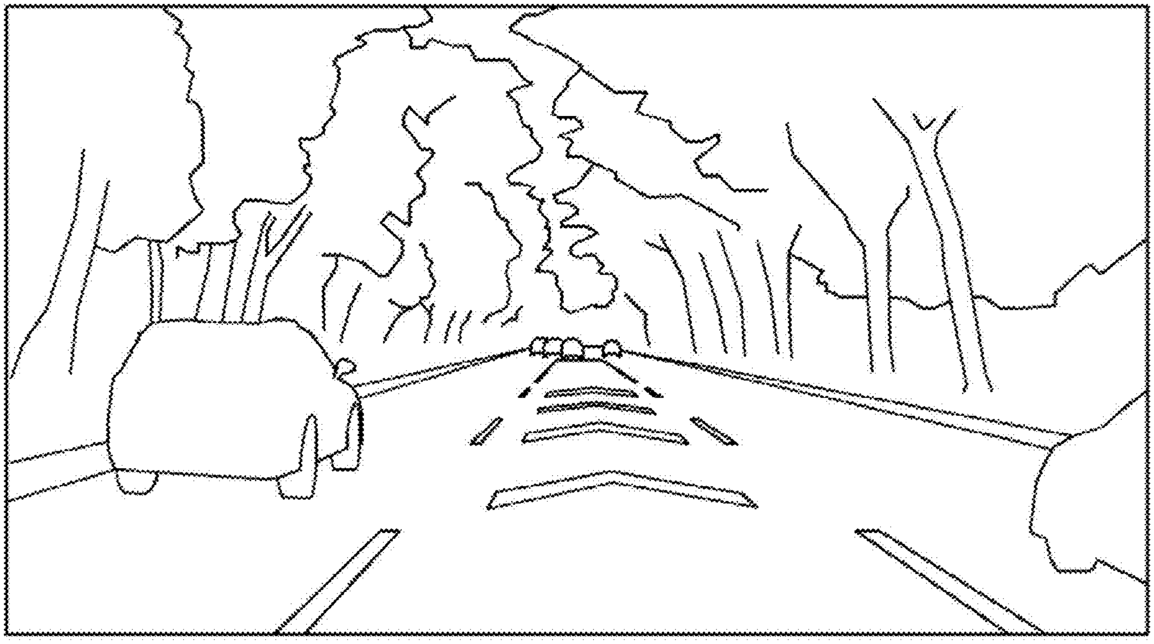
FIG. 4 is a schematic diagram of a scene image according to an embodiment of the present disclosure.

When the environment sensing device includes an image collector, a scene image may be collected by using the image collector (for example, a camera). For example, a camera shown in FIG. 3A is used for photographing a road scene in front of the vehicle in a driving direction of the current vehicle, to obtain a scene image, which is a real scene image. FIG. 4 is a schematic diagram of a scene image according to an embodiment of the present disclosure.

In addition, the environment sensing information may further include traffic participants (including a vehicle, a pedestrian, and a cyclist) around the current vehicle, traffic information such as traffic sign information and signal lamp information, status information of the current vehicle, positioning location information of the current vehicle, and the like. For example, distances to front and rear vehicles may be detected by using a radar, whether a pedestrian exists in front of the vehicle and a distance to the pedestrian are detected by using an infrared detector, and whether the vehicle encounters a collision or the like is determined by using a pressure sensor.

In one embodiment, a manner of obtaining the environment sensing information related to the current driving scene of the current vehicle may be: collecting, by using the automated driving domain, sensing data measured by the environment sensing device, transmitting the sensing data from the automated driving domain to the cockpit domain by using the cross-domain communication, and further determining the environment sensing information based on the sensing data obtained in the cockpit domain.

It may be understood that if the environment sensing device includes an image collector (for example, a camera), the collected sensing data may include a scene image. In this case, when the sensing data is transmitted from the automated driving domain to the cockpit domain, the collected sensing data may be packaged, the packaged sensing data is transmitted to the cockpit domain, and the packaged sensing data is directly used as the environment sensing information.

FIG. 3A is a schematic diagram of an automated driving data processing procedure according to an embodiment of the present disclosure. The environment sensing device includes a vision sensing device, such as a camera, and a scene image may be collected by using the camera.

In addition, the environment sensing device further includes an RTK positioning device and a radar sensing device. The environment sensing information is generated by the RTK positioning device, the vision sensing device, and the radar sensing device that are loaded on the automated driving system. The right side of FIG. 3A shows a test car loaded with a positioning device and a sensing device. After collecting sensing data of each sensor, the automated driving domain packages the sensing data and transmits the packaged sensing data to the cockpit domain in a cross-domain communication manner, using the packaged sensing data as the environment sensing information.

Vehicle driving state information of the current vehicle is obtained from the automated driving domain (which is collected based on the RTK positioning device, the camera, and the like shown in FIG. 3A and may represent the vehicle driving state of the current vehicle). In addition, sensing data or the like of the vehicle may be available and further transmitted to the cockpit domain through cross-domain communication. After receiving the sensing data, the cockpit domain may extract lane information from a scene image because the sensing data has the scene image. Further, a corresponding driving-state prompt element is generated based on the lane information, and fusion rendering is performed, to implement an effect of drawing automated driving state information on an AR map with reference to a state of an ego vehicle.

In a case in which the sensing data collected by the automated driving domain does not include the scene image, the scene image may be alternatively collected by using the cockpit domain.

In an embodiment, a manner of determining the environment sensing information based on the sensing data obtained in the cockpit domain may be collecting, by using the cockpit domain, a scene image related to the current driving scene of the current vehicle, and performing fusion based on the scene image and the sensing data to obtain the environment sensing information.

Figure 3B:
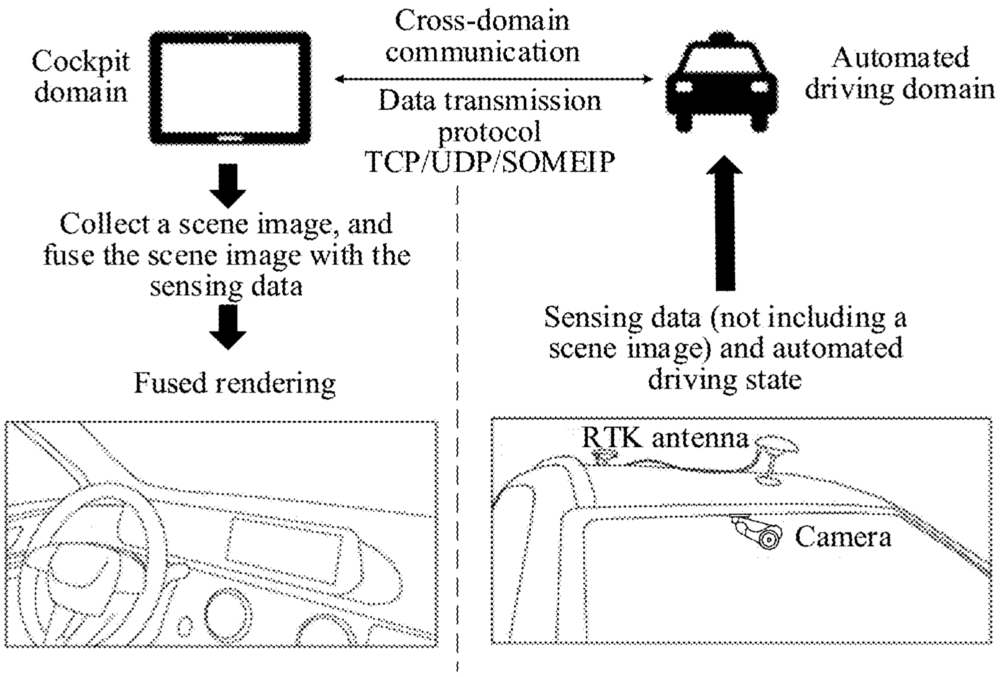
FIG. 3B is a schematic diagram of another automated driving data processing procedure according to an embodiment of the present disclosure.

FIG. 3B is a schematic diagram of another automated driving data processing procedure according to an embodiment of the present disclosure. For example, after collecting the sensing data of each sensor, the automated driving domain transmits the sensing data to the cockpit domain in a cross-domain communication manner. Further, after receiving the sensing data, the cockpit domain collects the scene image by using cockpit domain AR, and fuses it with the sensing data to obtain the environment sensing information.

Compared with FIG. 3A, a difference is that the sensing data collected in the automated driving domain does not include the scene image, that is, the sensing data transmitted from the automated driving domain to the cockpit domain does not include the scene image. Therefore, the cockpit domain may collect the scene image (which may be an augmented reality (AR) image) by using an AR sensing system, obtain AR sensing information (which is the scene image and includes lane information), and fuse the scene image with the received sensing data to obtain the environment sensing information.

Then, the lane information may be extracted from the scene image. Further, a corresponding driving-state prompt element is generated based on the lane information, and fusion rendering is performed, to implement an effect of drawing automated driving state information on an AR map with reference to a state of an ego vehicle.

In this embodiment of the present disclosure, through cross-domain transmission and dual-domain data linkage, excellent automated cockpit experience can be provided.

S22: Perform lane line detection on the scene image to obtain lane information in the current driving scene.

In this embodiment of the present disclosure, AR recognition is performed on the scene image, and lane information such as a road plane, a lane, and a lane line are recognized based on a lane line detection technology.

Figure 5:
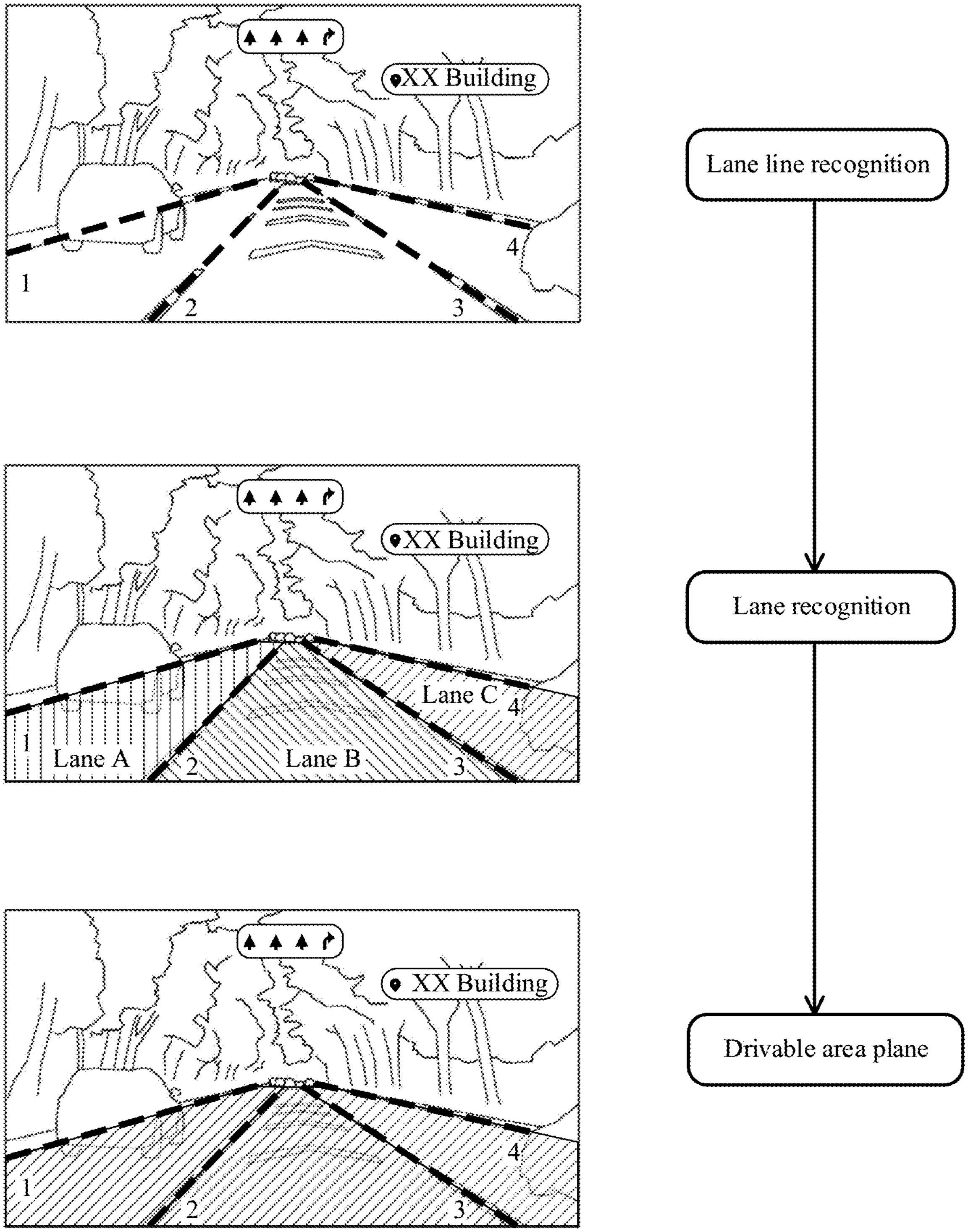
FIG. 5 is a schematic diagram of an AR recognition procedure according to an embodiment of the present disclosure.

FIG. 5 is a schematic diagram of an AR recognition procedure according to an embodiment of the present disclosure. In this embodiment of the present disclosure, FIG. 5 is obtained by performing AR recognition by using the scene image shown in FIG. 4 as an example. First, lane line recognition is performed, and lane lines in a current scene image are extracted by using a lane line detection algorithm. Lane line extraction results are respectively four lane lines in total: 1, 2, 3, and 4. Further, lane recognition is performed based on the recognized lane lines. The four lane lines form three complete lanes. The lane line 1 and the lane line 2 form a lane A, the lane line 2 and the lane line 3 form a lane B, and the lane line 3 and the lane line 4 form a lane C. Finally, a road plane constructed by the recognized lanes is determined. As shown in FIG. 5, the three lanes A, B, and C jointly form a drivable road plane area.

In a specific implementation process, lane line detection may be first performed on the current scene image to obtain multiple lane lines in the scene image. There are many lane line detection algorithms in an actual application process, which are not specifically limited in this specification.

Figure 6:
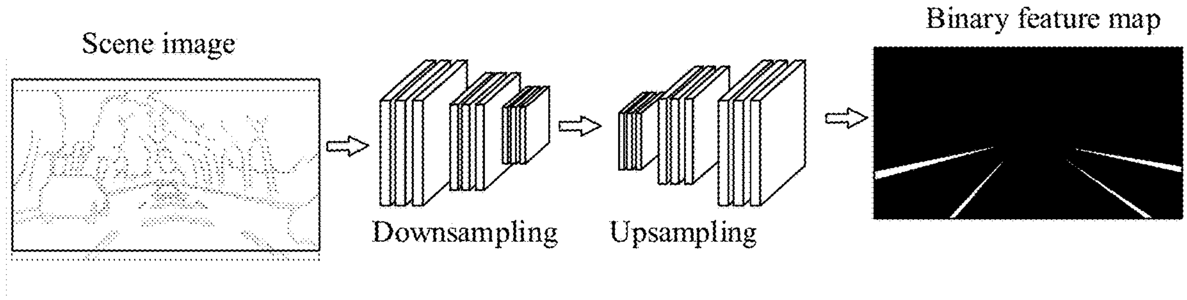
FIG. 6 is a schematic diagram of a lane line detection process according to an embodiment of the present disclosure.

FIG. 6 is a schematic diagram of a lane line detection process according to an embodiment of the present disclosure. Specifically, lane line detection may be performed on the current scene image by invoking a segmentation model, determining multiple lane lines. The process may be implemented based on a trained segmentation model. The segmentation model herein may be a downsampling+upsampling structure, as shown in FIG. 6. Downsampling processing is performed on an inputted scene image, and upsampling processing is performed on a downsampling result to obtain a binary feature map that is equivalent to the current scene image in size, for recognizing, based on the binary feature map, which pixels of the current scene image belong to a lane line and which pixels belong to a background, and determine multiple lane lines from the current scene image based on a recognition result. In the binary feature map shown in FIG. 6, a white pixel belongs to a lane line, and a black pixel belongs to a background. There are four lane lines in total in the scene image.

Figure 7A:
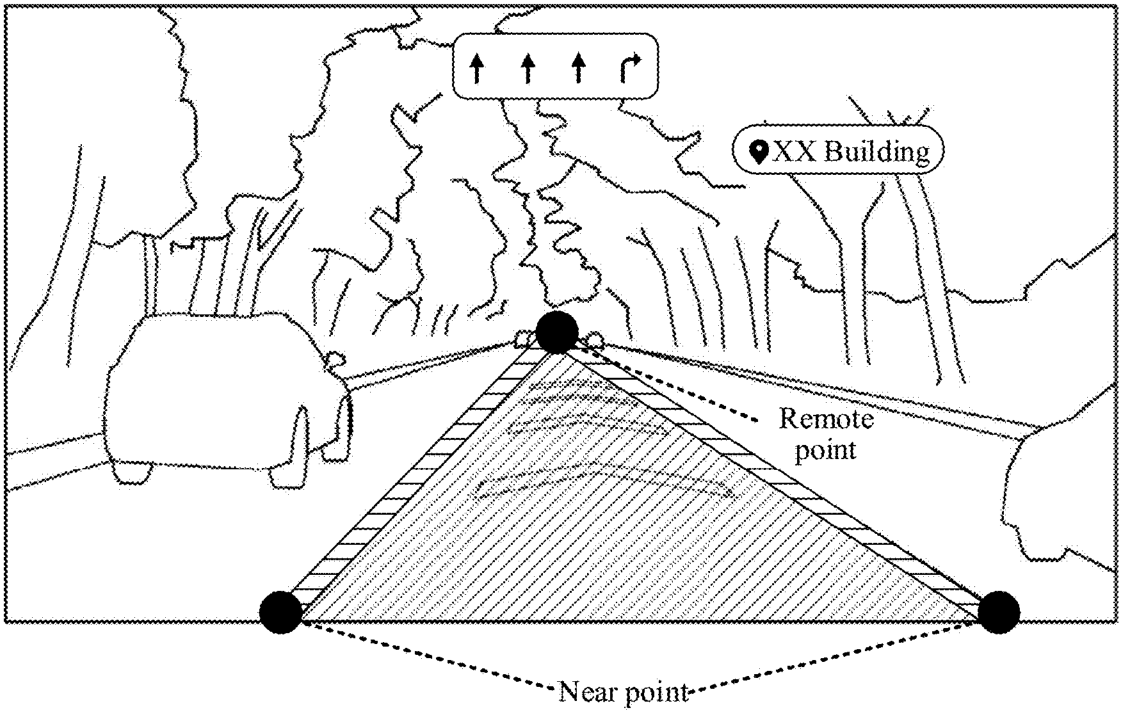
FIG. 7A is a schematic diagram of a lane recognition process according to an embodiment of the present disclosure.

After road plane lane lines are recognized, a lane and a drivable road plane area are determined according to the lane lines. FIG. 7A is a schematic diagram of a lane recognition process according to an embodiment of the present disclosure. A lane is an area formed by two adjacent lane lines, near points of the lane lines and far points of the lane lines. A lane plane may contain one or more lanes. As shown in FIG. 7A, a current lane area in which the current vehicle is located is represented, that is, a currently driving lane plane—the lane B. The lane is formed by enclosing the lane line 2, the lane line 3, and two near points (intersection points of the two lane lines and an image edge, respectively) and a far point (a lane line closing point) shown in FIG. 7A. Similarly, the lane A on the left side of the current lane and the lane C on the right side of the current lane may be further determined.

Figure 7B:
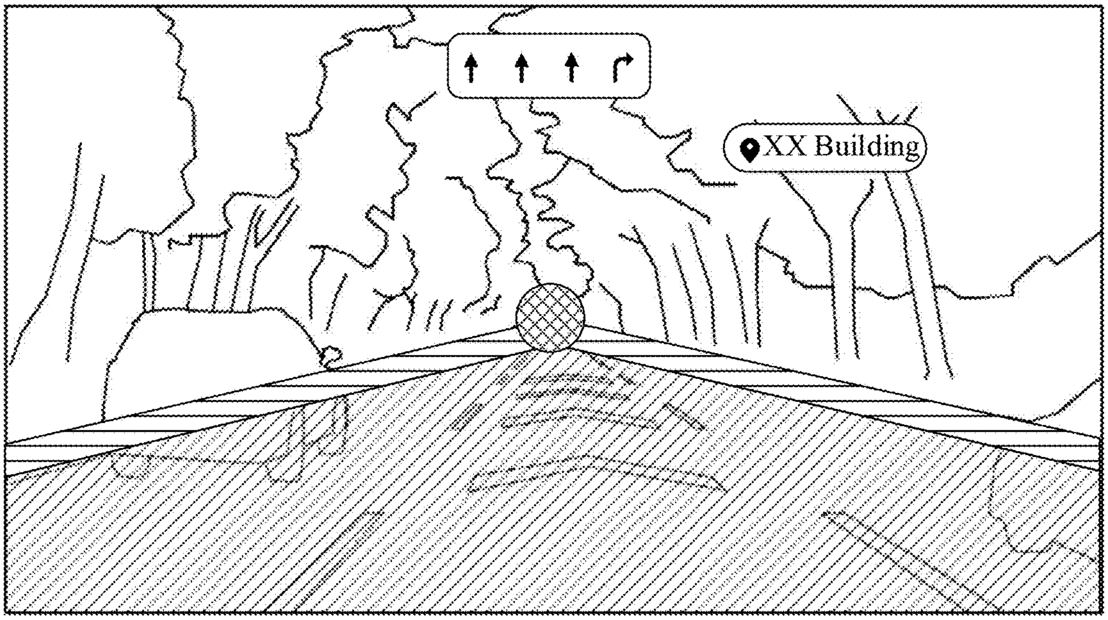
FIG. 7B is a schematic diagram of a road plane recognition process according to an embodiment of the present disclosure.

When the drivable road plane area is recognized, the foregoing recognized lanes may be combined to determine the drivable road plane area. Alternatively, a manner shown in FIG. 7B may be used. FIG. 7B is a schematic diagram of a road plane recognition process according to an embodiment of the present disclosure. Shown lane lines marked by using shadows indicate lane lines at edges of left and right lanes in the current scene, and a shaded area surrounded by the two lane lines is a drivable lane plane.

The foregoing enumerated manner of recognizing lane information is merely an example for description. Actually, any manner of obtaining related lane information based on a scene image is suitable according various embodiments of the present disclosure, and is not specifically limited herein.

S23: Generate a driving-state prompt element corresponding to the vehicle driving state based on the lane information, and perform superposed fusion on the driving-state prompt element and the environment sensing information to render and generate an augmented reality map.

For the current vehicle, there may be many vehicle driving states. In an automated driving scene, vehicle driving states may be correspondingly switched and jumped.

Figure 8:
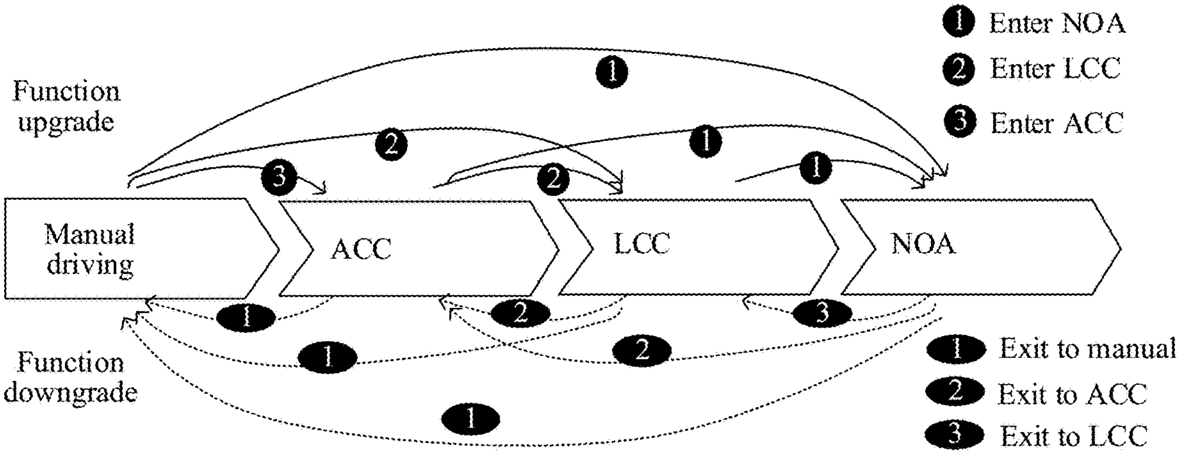
FIG. 8 is a schematic diagram of a jump logic of a vehicle driving state according to an embodiment of the present disclosure.

FIG. 8 is a schematic diagram of a jump logic of a vehicle driving state according to an embodiment of the present disclosure. The automated driving system includes switching of multiple driving states (function states). As shown in FIG. 8, a manual driving state, ACC, LCC, and NOA are listed.

State jump is divided into two categories: function upgrade and function downgrade. The function upgrade refers to step-by-step upgrade from full manual driving to high-order automated driving. Manual driving can be directly upgraded to ACC, LCC and NOA, or ACC is enabled first, LCC is then enabled, and NOA is finally enabled level-by-level. The function downgrade is the reverse of the function upgrade, indicating gradual downgrade from higher-order automated driving to full manual driving. Similarly, NOA may be directly downgraded to LCC, ACC, and manual driving, or it may first exit to LCC, then exit to ACC, and finally exit to manual driving level-by-level.

In this embodiment of the present disclosure, for each vehicle driving state, a corresponding driving-state prompt element may be generated based on the foregoing lane information. The driving-state prompt element may be prompt information that matches a function of the vehicle driving state, and the driving-state prompt element may be a guide line, a guide plane, a guide point, or the like. For example, when the current vehicle driving state is an automatic lane change state, a corresponding driving-state prompt element is to be an element that can represent a lane change related prompt, such as a lane change route (guide line), a lane after lane change (guide plane), and a location after lane change (guide point).

These driving-state prompt elements are superposed and fused with the environment sensing information, so that an augmented reality map that can represent the vehicle driving state can be rendered and generated. An augmented reality technology is used for fusing a scene image of a real scene with the vehicle driving state, so that an automated driving behavior can be presented to a vehicle associated object in multiple dimensions, thereby improving driving fun. In addition, the environment sensing information is used as a fusion basis, and a mapping result between the sensing data and the real world is presented, so that the vehicle associated object can obtain what it sees, thereby reducing an understanding cost of the vehicle associated object.

In one embodiment, the environment sensing information may further include positioning location information of the current vehicle. In this case, a manner in which the driving-state prompt element and the environment sensing information are superposed and fused, and the augmented reality map is rendered and generated may be: rendering, in the cockpit domain based on the positioning location information of the current vehicle, other information in the environment sensing information to generate an augmented reality map used for navigation, the other information being information in the environment sensing information except the positioning location information; and superposing and drawing, in a triangulation manner, the driving-state prompt element on the augmented reality map, and highlighting the driving-state prompt element in the augmented reality map. With reference to the positioning location information of the current vehicle, an augmented reality map that is more capable of reflecting the actual location of the current vehicle is generated, so that navigation is more accurately performed.

In one embodiment, there may be a deviation in the positioning location information in the environment sensing information. To ensure accuracy of a final augmented reality map, a correction operation may be performed on the positioning location information of the current vehicle with reference to the AR navigation information. Then, other information in the environment sensing information is integrated into the AR map based on the corrected positioning location information, and an augmented reality map used for navigation is rendered and generated. Finally, all the integrated information is displayed in the AR map.

In this embodiment of the present disclosure, before the driving-state prompt element corresponding to the vehicle driving state is generated based on the lane information, the positioning location information of the current vehicle is corrected with reference to the augmented reality navigation information for the current vehicle, thereby further improving accuracy of a final result.

S24: Display the augmented reality map.

After the augmented reality map is obtained, the augmented reality map may be displayed for the vehicle associated object to view. In one embodiment, the augmented reality map may be displayed on a display screen. A quantity of display screens may be one or more (that is, at least one), which is not limited in this embodiment of the present disclosure. In one embodiment, the display screen may be a display screen included in the cockpit domain.

The display screen may be a display screen that is in the current vehicle and that is used for displaying an AR map, or may be another display screen. The AR map may be displayed in some or all areas of these display screens, and this may depend on display policies used by different display screens for the AR map.

In this embodiment of the present disclosure, the display screen that can support display of the AR map in the vehicle may include but is not limited to: a center console screen, a dashboard screen, an augmented reality head up display (AR-HUD) screen, and the like.

In some embodiments, the cockpit domain in the present disclosure includes at least one display screen, that is, the augmented reality map may be displayed on at least one display screen included in the cockpit domain.

The following uses an example in which the cockpit domain includes an AR-HUD screen, a dashboard screen, and a center console screen.

Figure 9:
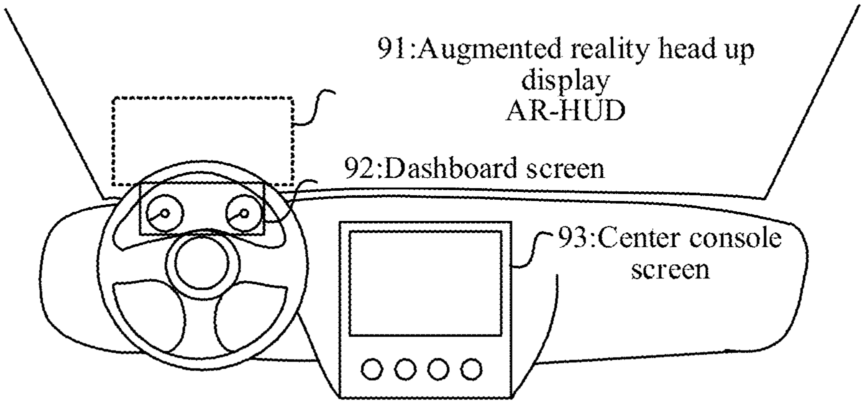
FIG. 9 is a schematic diagram of a vehicle display screen according to an embodiment of the present disclosure.

FIG. 9 is a schematic diagram of a vehicle display screen according to an embodiment of the present disclosure. 91 is an AR-HUD screen, 92 is a dashboard screen, and 93 is a center console screen.

The AR-HUD screen shown in 91 is a display screen on a front windshield at a driving location. Because the AR map may be displayed in full screen, when the AR map is displayed by using the AR-HUD screen, the foregoing mentioned display screen may be the entire area of the AR-HUD screen.

The dashboard screen shown in FIG. 92 refers to a display screen used for displaying an instrument of a vehicle. A physical size of the dashboard screen is relatively small relative to a physical size of the center console screen, and generally resolution of the dashboard screen is lower than resolution of the center console screen. A display effect of the instrument panel needs to be adapted according to the resolution of the screen. Because the dashboard screen may support display of an AR map in a remaining area other than an area in which the instrument is located, when the AR map is displayed by using the dashboard screen, the display screen mentioned above may be a partial area of the dashboard screen.

The center console screen shown in 93 refers to a display screen on a central console, and is mainly used for displaying content such as vehicle audio, navigation, vehicle information, and rearview camera images. Because the center console screen may display the AR map in full screen or display the AR map in split screen, when the AR map generated in S23 is displayed on the center console screen, the foregoing display screen may be a partial area or the entire area of the center console screen.

The foregoing enumerated several AR map display manners are merely examples for description. In addition, another display screen may be further used for displaying the AR map in the present disclosure, for example, a mobile phone screen, a tablet computer screen, or a third screen in a vehicle. This is not specifically limited in this specification.

As such, a multi-dimensional presentation matrix (a center console screen, a dashboard screen, an AR-HUD screen, and the like) can be provided, to facilitate the vehicle associated object to separately view, thereby improving a sense of technology, and increasing a trust degree by an object.

In one embodiment, in a driving process of the current vehicle, a navigation interface may be displayed, and the navigation interface includes the AR map generated in S23. The AR map is used for presenting the current driving scene of the current vehicle and the vehicle driving state of the current vehicle.

Figure 10:
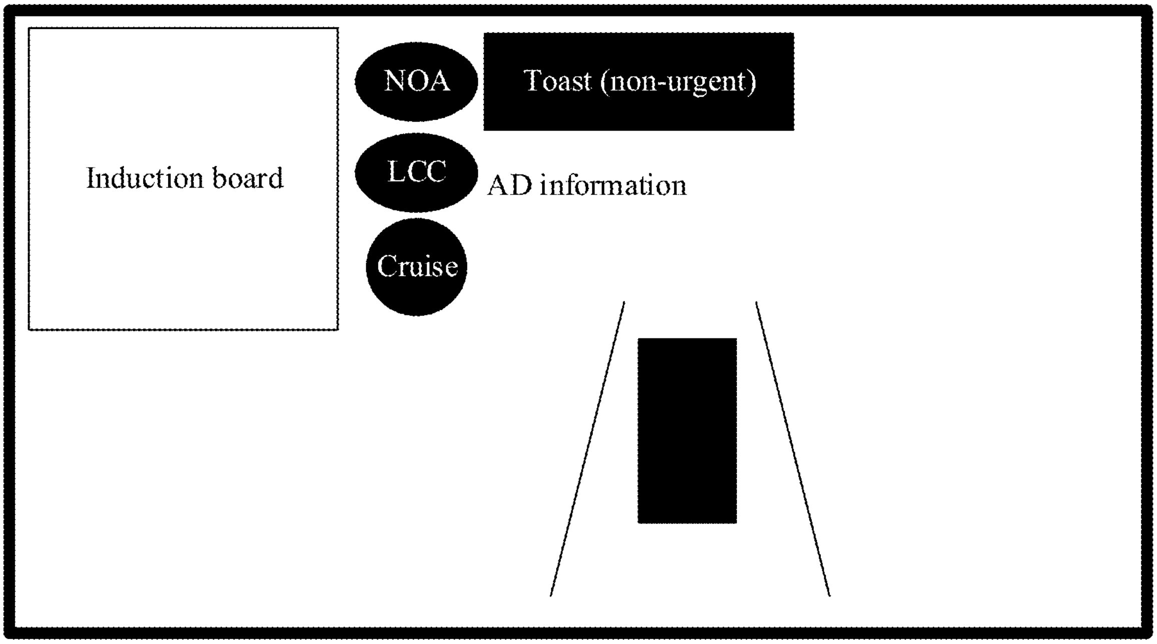
FIG. 10 is a schematic diagram of a product prototype of an AR map according to an embodiment of the present disclosure.

FIG. 10 is a schematic diagram of a product prototype of an AR map according to an embodiment of the present disclosure. An induction panel is used for displaying road maneuver point information (a maneuver point type, a maneuver point distance, a maneuver point name, and the like). An NOA area is used for presenting a state of NOA (for example, not available, standby, and active), and a toast area next to NOA is used for displaying a current state change. An LCC area is used for displaying a state of an LCC function. A cruise area is used for displaying a state of ACC. In FIG. 10, a white area at the bottom of the figure represents map display. The lower block in the middle of the figure indicates the location of the ego vehicle, and the line next to the ego vehicle indicates lane line information (used for displaying driving-state prompt elements corresponding to lane locking, lane deviation, and lane change states).

Figure 11:
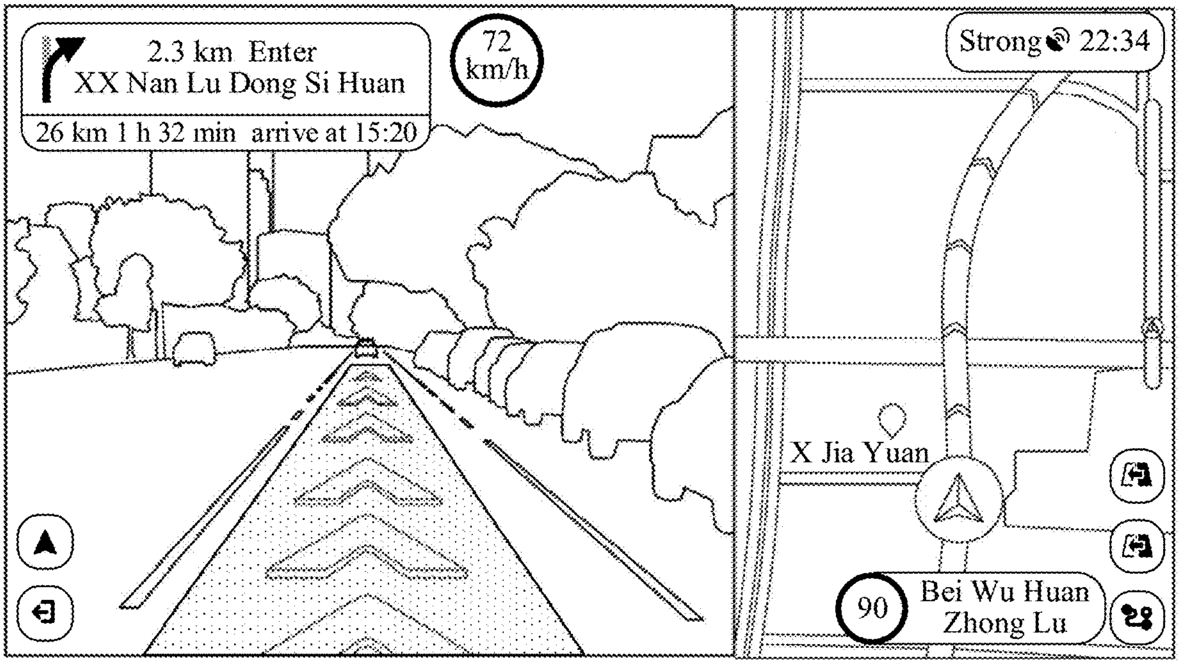
FIG. 11 is a schematic diagram of a cockpit visualization interface effect in a driving scene according to an embodiment of the present disclosure.

Based on the schematic diagram of the product prototype shown in FIG. 10, FIG. 11 is a schematic diagram of a cockpit visualization interface effect in a vehicle driving scene. The vehicle driving scene is a scene in which the vehicle is driven by an in-vehicle automated driving system, and is different from a vehicle driving scene in which a human driver controls driving of the vehicle.

As shown in FIG. 11, the left part enumerated in the figure is an AR map in the present disclosure, and the right part is a navigation figure based on standard dimension navigation (SD). The AR map and the SD navigation figure may be simultaneously displayed on at least one display screen of the current vehicle. In the present disclosure, in a vehicle driving scene, information such as a vehicle location and an automated driving system status may be displayed on a cockpit screen, which may provide an interpretable and easy-to-understand visual result for a vehicle associated object, so that the vehicle associated object learns more about a capability and a status of the automated driving system, thereby improving a safety sense of the vehicle associated object.

In an embodiment, the process of "performing superposed fusion on the driving-state prompt element and the environment sensing information to render and generate a corresponding augmented reality map" in S23 may be further divided into the following substeps:

S231: Render and generate, based on the environment sensing information, an augmented reality map for navigation. In this case, the obtained AR map may be referred to as an initial AR map.

S232: Superpose and draw, in a triangulation manner, the driving-state prompt element on the augmented reality map, and highlight the driving-state prompt element in the augmented reality map to obtain a final AR map.

There are many manners of highlighting an element in an image, such as highlighted display, magnified display, marking with a special color, marking with a special pattern, and the like. In this specification, highlighted display is used as an example for description, and another manner is also applicable. This is not specifically limited in this specification.

In addition, considering that there are many automated driving states, a switching logic is complex, and figure presentation in various states is different. With reference to several vehicle driving states listed in FIG. 8, the following describes in detail a process of generating and drawing various driving-state prompt elements in the present disclosure.

Case 1: If the vehicle driving state is a manual driving state, the driving-state prompt element includes a drivable lane plane corresponding to a lane in which the current vehicle is currently located.

In the manual driving state, the vehicle can be driven only after manual intervention is required. Therefore, only the lane in which the ego vehicle is located needs to be prompted. For example, in the manual driving state, the lane in which the ego vehicle is located may be drawn as a highlighted area full of lanes, where the area is a drivable lane plane, and highlighting is a manner of highlighting the driving-state prompt element.

Figure 12:
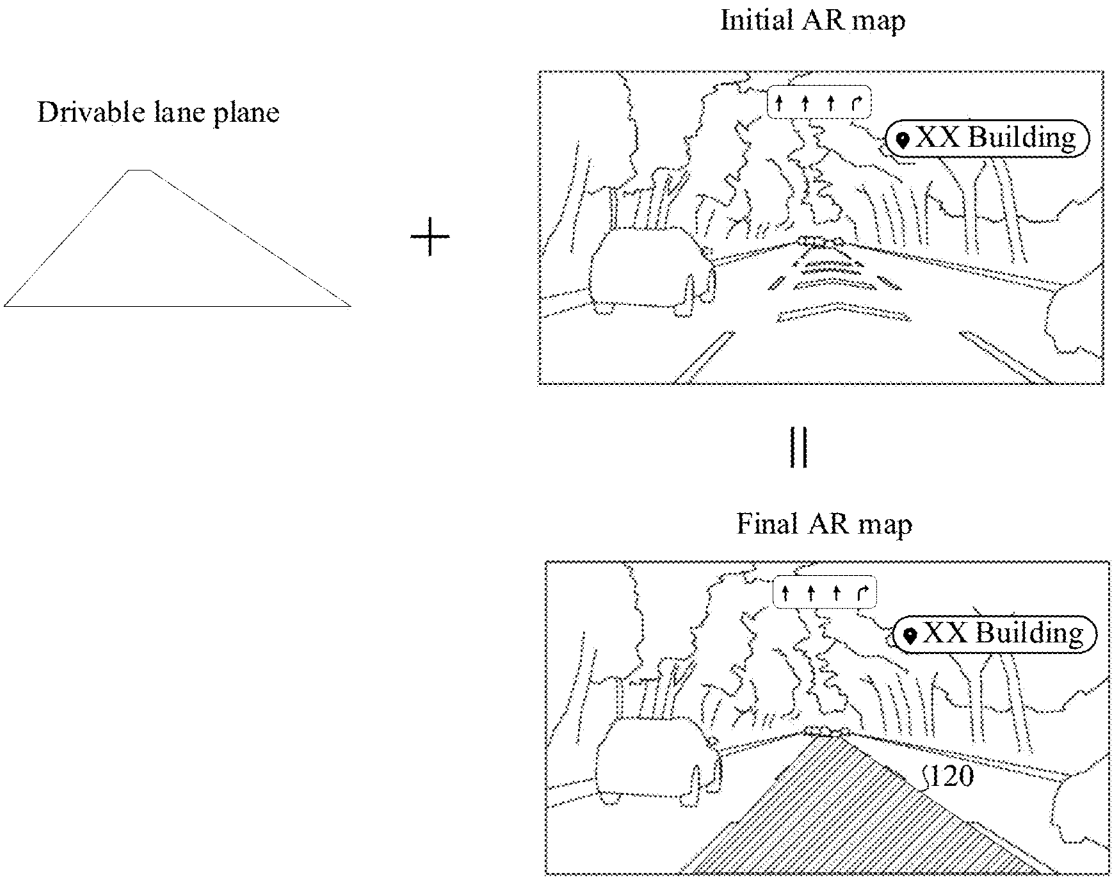
FIG. 12 is a schematic diagram of an AR map in a manual driving state according to an embodiment of the present disclosure.

In this embodiment of the present disclosure, the generated drivable lane plane is drawn on an initial AR map in a triangulation manner, to obtain a final AR map that highlights the driving-state prompt element corresponding to the manual driving state. FIG. 12 is a schematic diagram of an AR map in a manual driving state according to an embodiment of the present disclosure. The manual driving state may be indicated by highlighting the current lane of the current vehicle in the AR map. The drivable lane plane corresponding to the current lane of the current vehicle is the driving-state prompt element corresponding to the manual driving state. As shown in the portion of FIG. 12 shown at 120, due to drawing constraints, FIG. 12 is filled with shadow to indicate highlighting.

In this case, the corresponding driving-state prompt element may be generated in the following manner. For a specific process, refer to FIG. 13.

Figure 13:
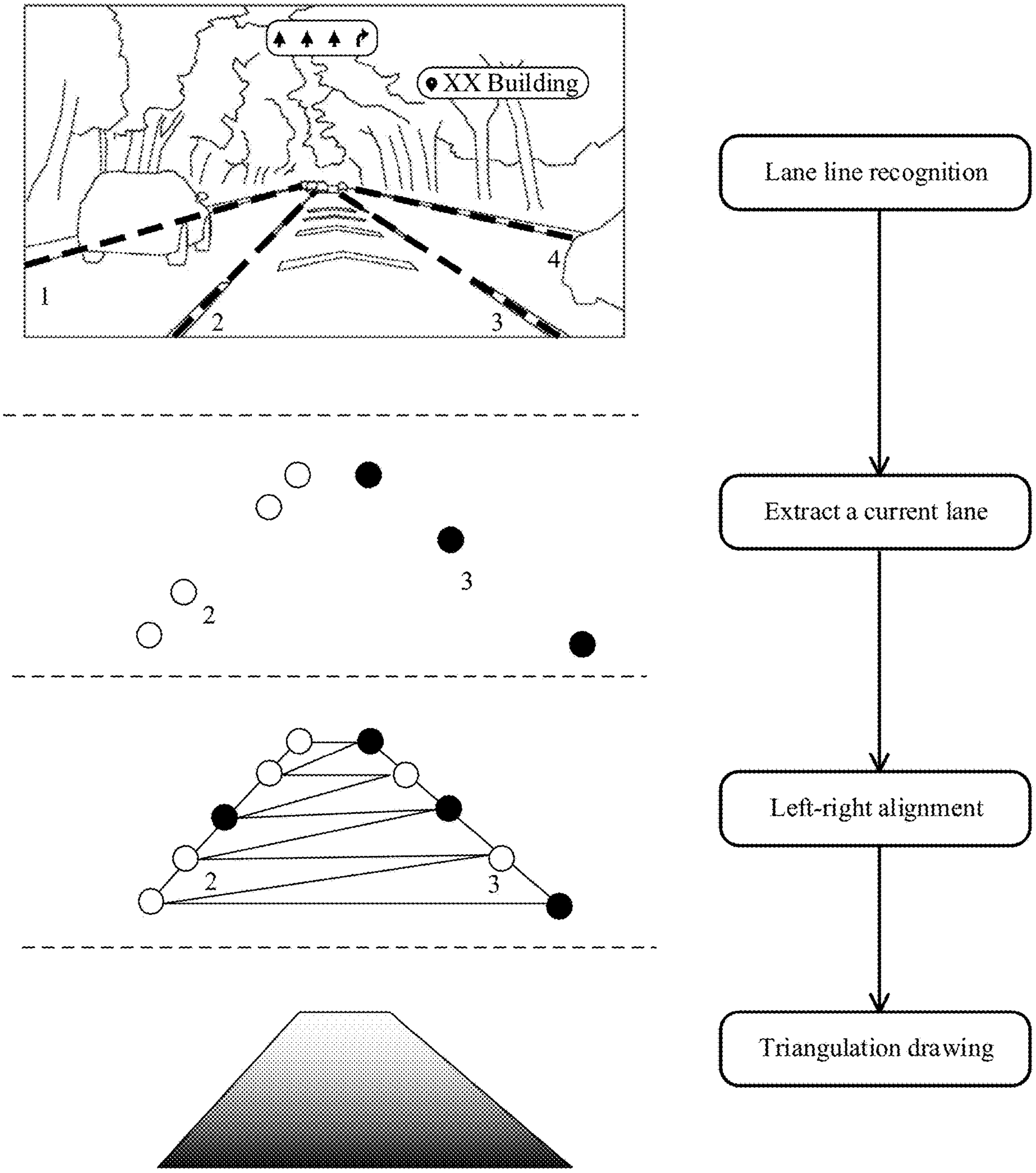
FIG. 13 is a flowchart of a drivable lane plane drawing method according to an embodiment of the present disclosure.

FIG. 13 is a flowchart of a drivable lane plane drawing method according to an embodiment of the present disclosure.

First, lane information of the current scene image obtained through lane line recognition is obtained. An example in which the lane information includes lane lines, for example, the lane line 1, the lane line 2, the lane line 3, and the lane line 4 that are marked in FIG. 13 corresponding to the lane line recognition process shown in FIG. 13 is used.

Further, based on the positioning location information of the current vehicle, the lane in which the current vehicle is currently located is determined from the lane information, and each lane line of the lane in which the current vehicle is currently located is sampled to obtain multiple first sampling points. Affected by a sampling interval, if there is a case in which sampling points on the left and right lanes are not corresponding to each other, multiple obtained first sampling points further need to be aligned, a missing point is supplemented to obtain supplemented first sampling points, and supplemented sampling points on each lane line in the first sampling points are corresponding to each other. Then, a drivable lane plane corresponding to the manual driving state is generated based on the supplemented first sampling points.

As shown in FIG. 13, the lane in which the current vehicle is currently located is a lane formed by a lane line 2 and a lane line 3. Based on this, the lane line 2 and the lane line 3 corresponding to the current lane are extracted, and sampling is performed to obtain multiple sampling points (denoted as first sampling points). In FIG. 13, four white sampling points corresponding to the lane line 2 and three black sampling points corresponding to the lane line 3 are corresponding to the process of extracting the current lane shown in FIG. 13.

Affected by the sampling interval, if there is a case in which the sampling points on the left and right lanes are not corresponding to each other, the multiple obtained first sampling points need to be aligned, and a missing point needs to be supplemented. In FIG. 13, the alignment may be left-right alignment, as shown in left-right alignment steps in FIG. 13.

Additionally, if left-right alignment can be directly performed, there is no need to supplement the missing point, that is, this step of supplementing the missing point may be determined according to an actual situation. This is not specifically limited in this specification.

Finally, based on the supplemented first sampling points, a drivable lane plane corresponding to the manual driving state may be generated. In this embodiment of the present disclosure, the drivable lane plane may be superposed and drawn on the AR map in a triangulation drawing manner, and finally, the final AR map shown in FIG. 12 may be obtained.

Case 2: When the vehicle driving state is a first automated driving state, the driving-state prompt element includes a lane line area corresponding to the lane in which the current vehicle is currently located. The first automated driving state is a lane center control enabled state.

In a state in which LCC is enabled, the vehicle is kept at the center of the current lane. Therefore, the current lane needs to be locked, that is, the object is prompted through figure lane locking that the LCC driving state has been entered, and lane lines on the left and right sides of the lane in which the ego vehicle is located are used as prompts. For example, in the first automated driving state, the lane lines on the left and right sides of the lane in which the ego vehicle is located may be drawn as highlighted lanes, and the two highlighted lanes, that is, the lane line area, are highlighted as a manner of highlighting the driving-state prompt element.

Figure 14:
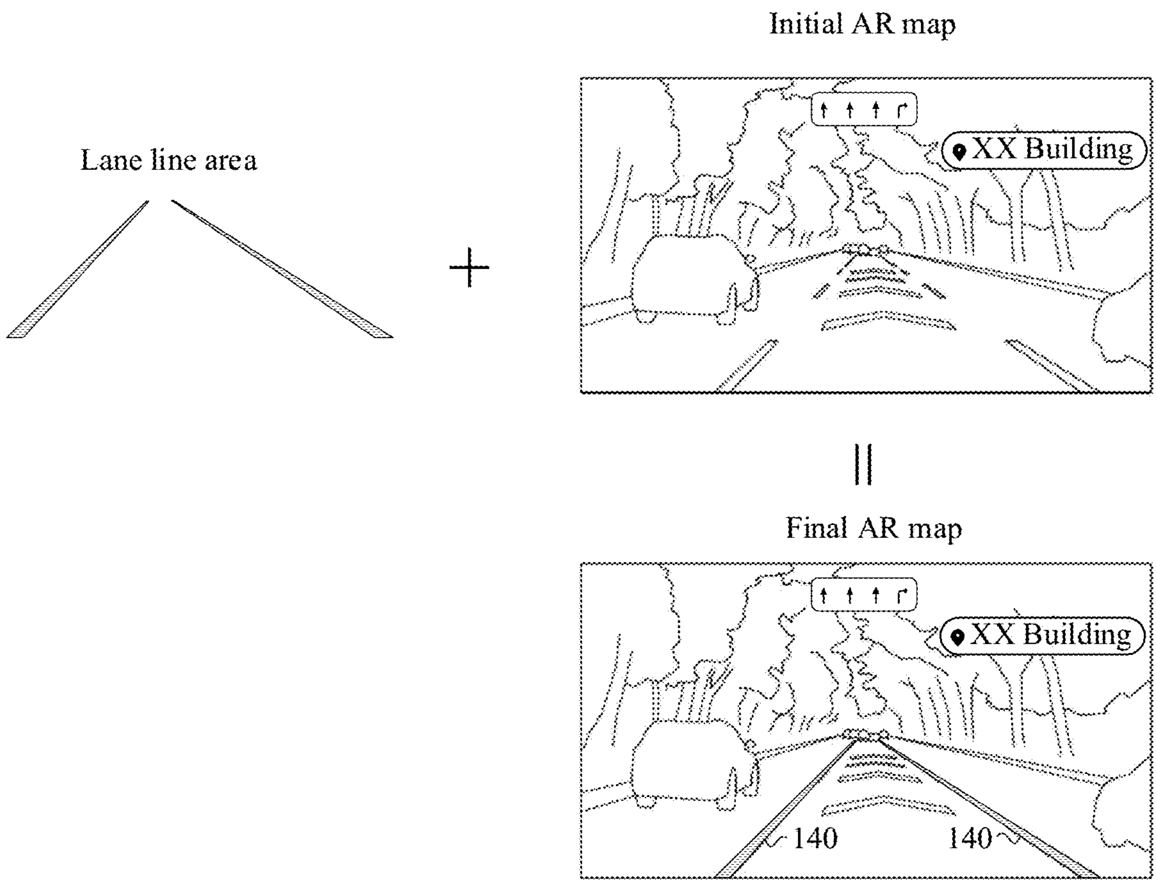
FIG. 14 is a schematic diagram of an AR map in a first automated driving state according to an embodiment of the present disclosure.

In this embodiment of the present disclosure, the generated lane line area is superposed and drawn on the initial AR map in a triangulation manner, to obtain a final AR map in which the corresponding driving-state prompt element of the first automated driving state is highlighted. FIG. 14 is a schematic diagram of an AR map in a first automated driving state according to an embodiment of the present disclosure. An LCC enabled prompt may be represented by performing lane locking in the AR map, to prompt the vehicle associated object that currently the LCC driving state has been entered. The lane line area corresponding to the lane in which the current vehicle is currently located (that is, an area that includes lane lines and has a specific width, and the lane line is generally used as a center of the area), that is, the driving-state prompt element corresponding to the LCC driving state. As shown in the portion of FIG. 14 shown at 140, due to drawing constraints, FIG. 14 is filled with shadow to indicate highlighting.

In this case, the corresponding driving-state prompt element may be generated in the following manner. For a specific process, refer to FIG. 15.

Figure 15:
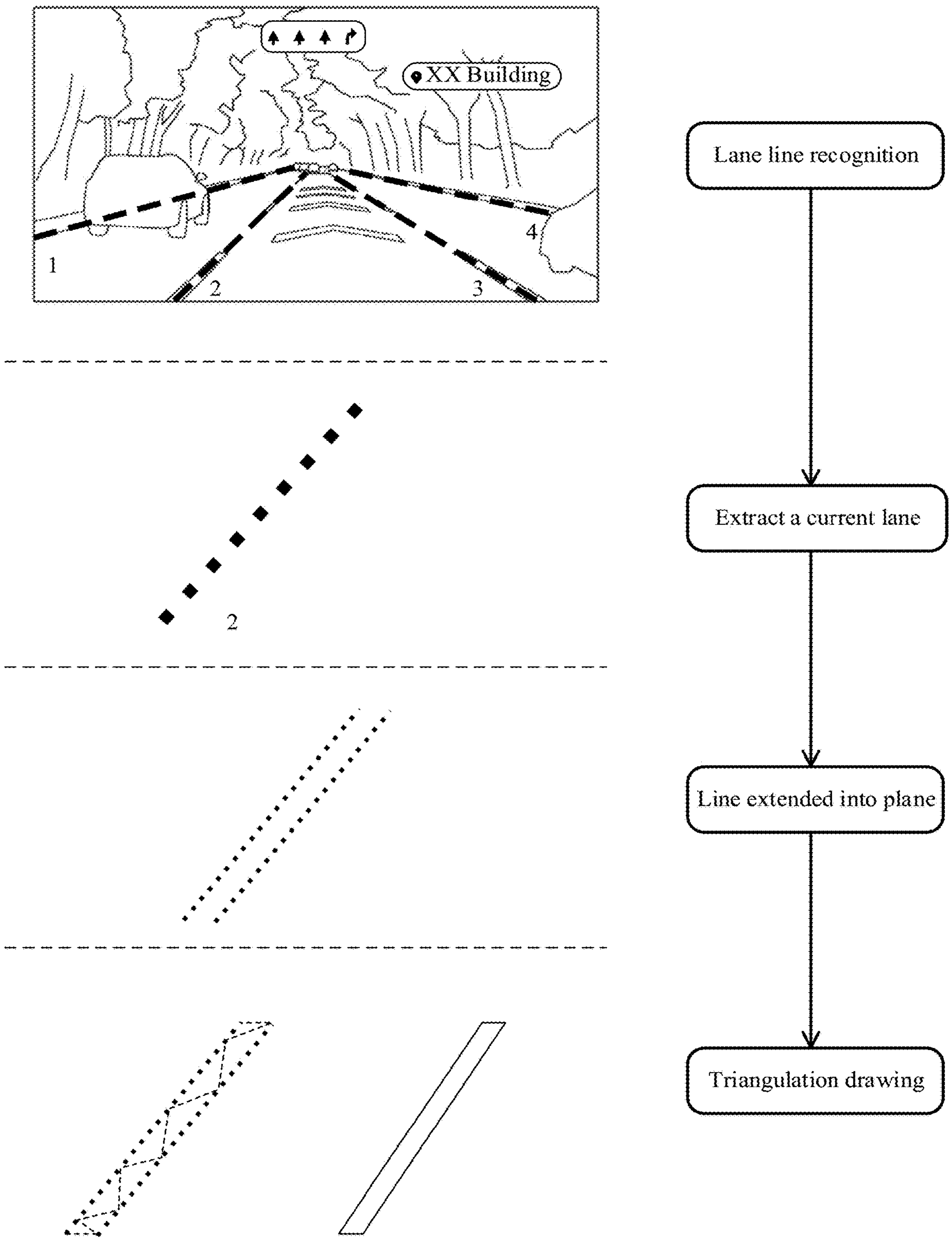
FIG. 15 is a flowchart of a lane line area drawing method according to an embodiment of the present disclosure.

FIG. 15 is a flowchart of a lane line area drawing method according to an embodiment of the present disclosure.

First, lane information of the current scene image obtained through lane line recognition is obtained. An example in which the lane information includes lane lines, for example, the lane line 1, the lane line 2, the lane line 3, and the lane line 4 that are marked in FIG. 15 corresponding to the lane line recognition process shown in FIG. 15 is used.

Further, each lane line of the lane in which the current vehicle is currently located is extracted from lane information based on the positioning location information of the current vehicle. Still using the foregoing as an example, the lane in which the current vehicle is currently located is the lane formed by the lane line 2 and the lane line 3. In this process, the two lane lines included in the current lane need to be separately extracted. In FIG. 15, the lane line 2 is used as an example. For the lane line 3, the same processing manner is used. Details are not described herein again. This is corresponding to the lane line extraction process shown in FIG. 15.

After each lane line is extracted, a first width is separately extended in a first preset direction by using a location of each lane line as a center, to obtain a lane line area corresponding to the first automated driving state. The first preset direction is a direction perpendicular to the lane line.

This step is a line-extended-into-plane process. The lane line 2 is used as an example, and the first preset direction is a direction perpendicular to the lane line 2. As shown in FIG. 15, the location of the lane line may be used as a center, and a d1 width may be extended left and right to obtain a lane line area. Similarly, a lane line area corresponding to the lane line 3 may also be obtained.

In this embodiment of the present disclosure, the two lane line areas may be superposed and drawn on the AR map in a triangulation drawing manner, and finally, the final AR map shown in FIG. 14 may be obtained.

Case 3: When the vehicle driving state is a second automated driving state, the driving-state prompt element includes a lane central area corresponding to the lane in which the current vehicle is currently located. The second automated driving state is a navigate on autopilot enabled state.

In a state in which NOA is enabled, a destination may be set to guide the vehicle to automatically drive, and an operation such as lane change and overtaking, automated driving in, and driving out of a ramp may be completed under supervision of the driver, and the object may be prompted by using a figure guide line that the NOA driving state currently has been entered. For example, in the second automated driving state, a guide line may be drawn based on a lane center line of the lane in which the ego vehicle is located, and this guide line is a lane center area.

Figure 16:
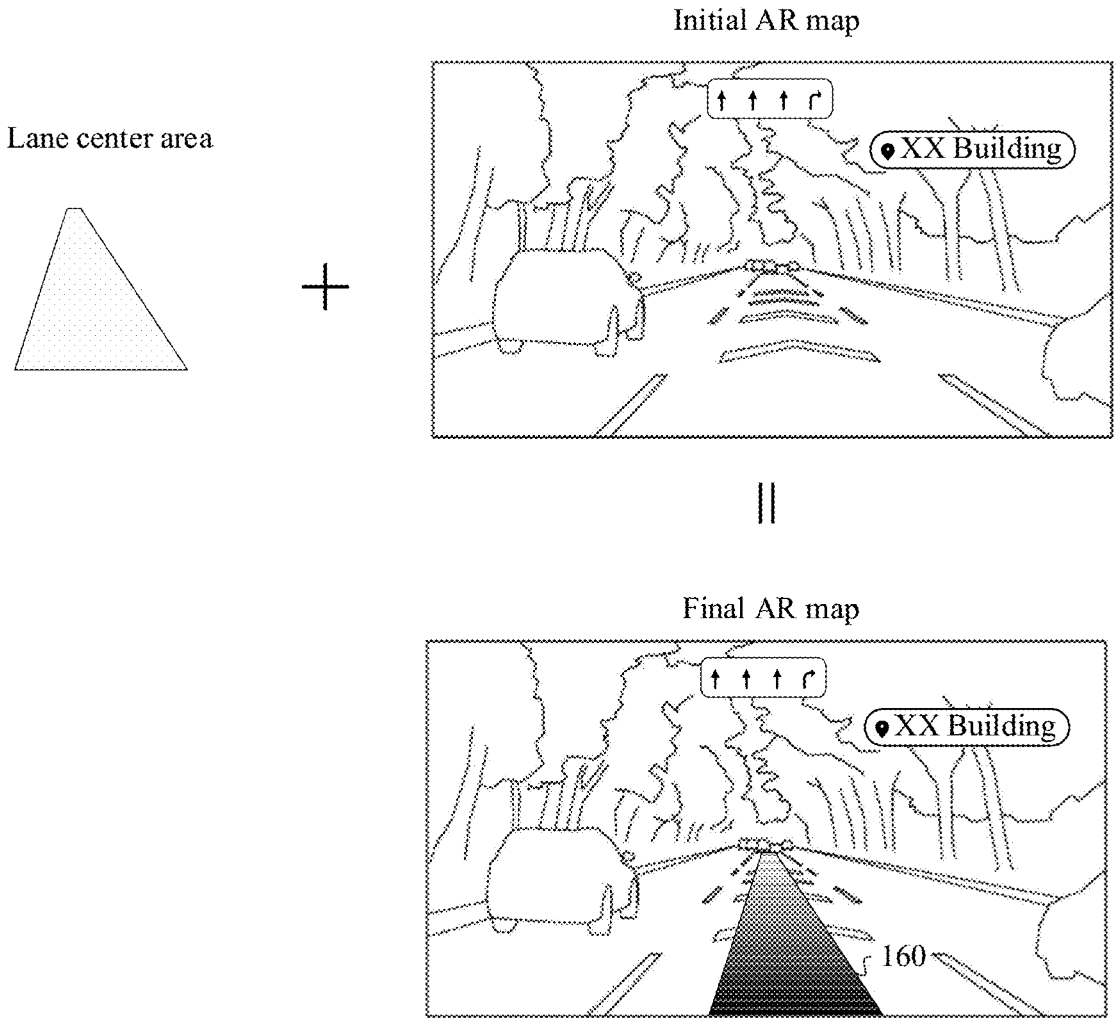
FIG. 16 is a schematic diagram of an AR map in a second automated driving state according to an embodiment of the present disclosure.

In this embodiment of the present disclosure, the generated lane center area is superposed and drawn on the initial AR map in a triangulation manner, to obtain a final AR map in which the corresponding driving-state prompt element of the second automated driving state is highlighted. FIG. 16 is a schematic diagram of an AR map in a second automated driving state according to an embodiment of the present disclosure. An NOA enabled prompt may be implemented by marking with a blue guide line in the AR map, for prompting the vehicle associated object that currently the NOA driving state has been entered. Part 160 in FIG. 16 is the blue guide line, that is, the lane center area. Due to drawing constraints, FIG. 16 is filled with shadow to indicate blue. The lane center area is the driving-state prompt element corresponding to the second automated driving state.

In this case, the corresponding driving-state prompt element may be generated in the following manner. For a specific process, refer to FIG. 17.

Figure 17:
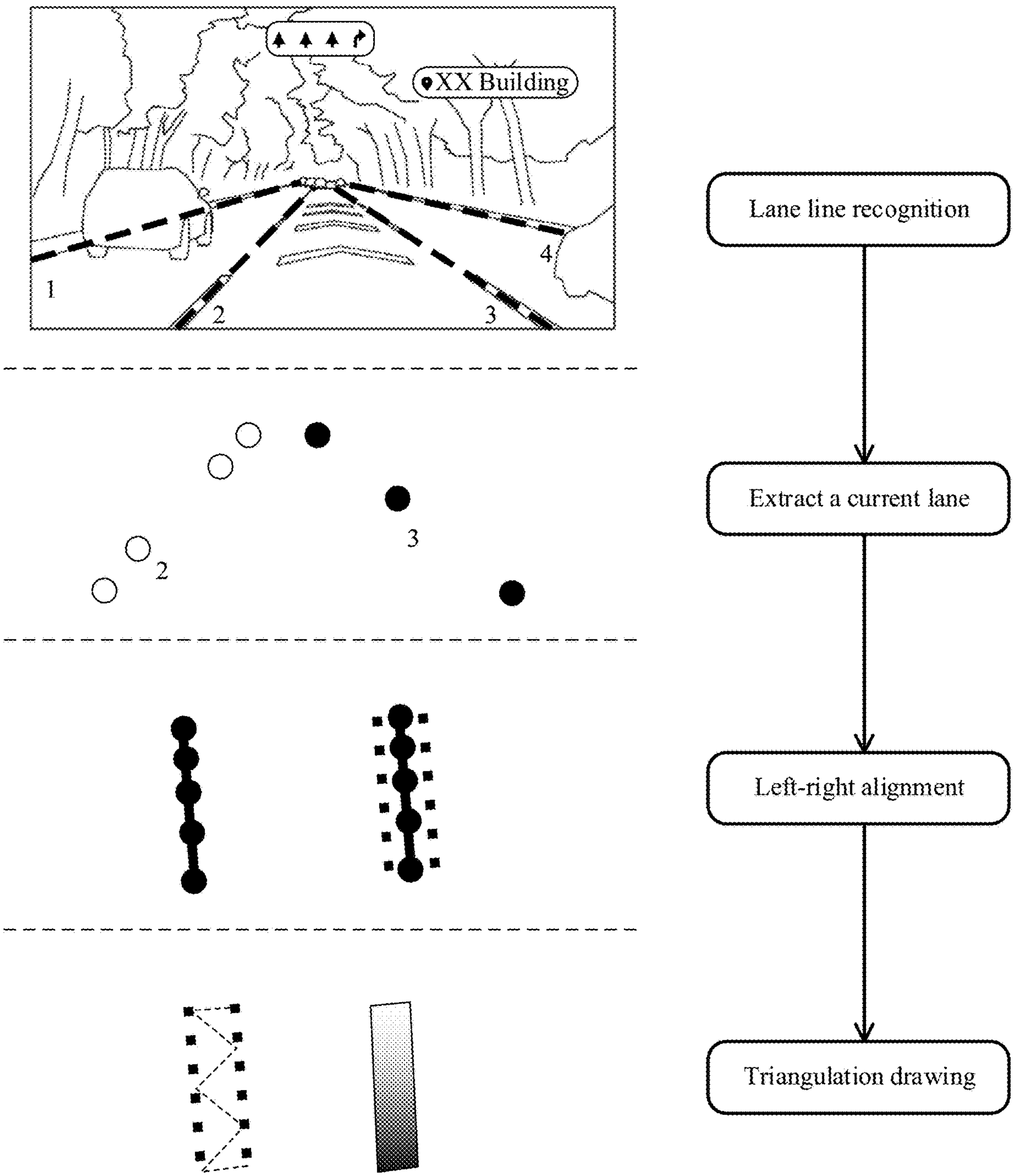
FIG. 17 is a flowchart of a lane center area drawing method according to an embodiment of the present disclosure.

FIG. 17 is a flowchart of a lane center area drawing method according to an embodiment of the present disclosure.

First, lane information of the current scene image obtained through lane line recognition is obtained. An example in which the lane information includes lane lines, for example, the lane line 1, the lane line 2, the lane line 3, and the lane line 4 that are marked in FIG. 17 corresponding to the lane line recognition process shown in FIG. 17 is used.

Further, based on the positioning location information of the current vehicle, the lane in which the current vehicle is currently located is determined from the lane information, and each lane line of the lane in which the current vehicle is currently located is sampled to obtain multiple first sampling points. As shown in FIG. 17, the lane in which the current vehicle is currently located is a lane formed by a lane line 2 and a lane line 3. Based on this, the lane line 2 and the lane line 3 corresponding to the current lane are extracted, and sampling is performed to obtain multiple sampling points (denoted as first sampling points). In FIG. 13, four white sampling points corresponding to the lane line 2 and three black sampling points corresponding to the lane line 3 are corresponding to the process of extracting the current lane shown in FIG. 17.

Further, the multiple obtained first sampling points are aligned, and a missing point is supplemented to obtain supplemented first sampling points, sampling points on each lane line in the supplemented first sampling points being corresponding to each other. In FIG. 17, the alignment may be left-right alignment. A lane center line of the current lane is obtained based on an average value of groups of aligned first sampling points in the supplemented first sampling points. As shown in FIG. 17, first, first sampling points corresponding to each group (that is, one sampling point on both the left and the right, that is, sampling points corresponding to corresponding locations in the lane line 2 and the lane line 3) are averaged to obtain a corresponding center point. Further, these center points are connected to form a lane center line, which corresponds to the lane center line left-right extension process shown in FIG. 17.

Finally, a second width is extended in a second preset direction by using a location of the lane center line of the current lane as a center, to obtain a lane center area corresponding to the second automated driving state; and the second preset direction is a direction perpendicular to the lane center line.

This step is a process of extending the lane center line left and right, and the second preset direction is a direction perpendicular to the lane center. As shown in FIG. 17, the location of the lane center line may be used as a center, and a d2 width may be extended left and right to obtain a lane center area.

In this embodiment of the present disclosure, the lane center area may be superposed and drawn on the AR map in a triangulation drawing manner, and finally, the final AR map shown in FIG. 16 may be obtained.

Case 4: When the vehicle driving state is a third automated driving state, the driving-state prompt element includes at least one of a lane change route area, a target lane area after lane change, and a vehicle landing area; the third automated driving state is an automatic lane change state; and the vehicle landing area is used for representing a location of the current vehicle in a target lane in a case of changing to the target lane.

In the automatic lane change state, the object may be prompted by using a figure lane change guide (such as a blue guide line, a highlighted target lane, and a target vehicle landing point) that a lane change operation is being performed.

Figure 18:
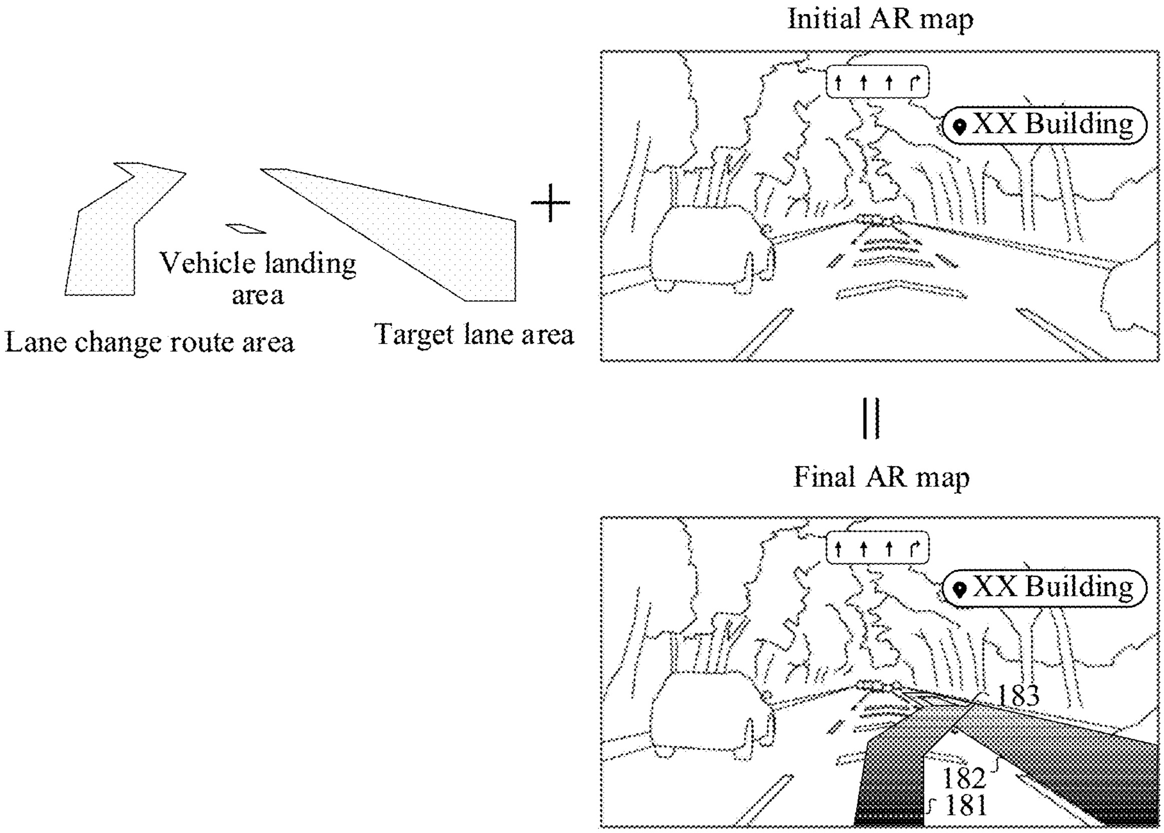
FIG. 18 is a schematic diagram of an AR map in a third automated driving state according to an embodiment of the present disclosure.

An example in which the driving-state prompt element includes a lane change route area, a target lane area after lane change, and a vehicle landing area is used. In this embodiment of the present disclosure, the generated lane change route area, the target lane area after lane change, and the vehicle landing area are superposed and drawn on the initial AR map in a triangulation manner, to obtain a final AR map in which the corresponding driving-state prompt element of the third automated driving state is highlighted. FIG. 18 is a schematic diagram of an AR map in a third automated driving state according to an embodiment of the present disclosure. An automatic lane change state prompt is to prompt, by using a figure lane change guide (a lane change route area 181 with a blue mark, a highlighted target lane 182, and a highlighted vehicle landing area 183), the vehicle associated object that a lane change operation is currently being performed. Both the blue mark and the highlighting are highlighting manners. This is not specifically limited in this specification. Due to drawing constraints, FIG. 18 is filled with different shadow to indicate the blue mark and the highlighting.

In this case, the corresponding driving-state prompt element may be generated in the following manner. For a specific process, refer to FIG. 19A to FIG. 19C.

Figure 19A:
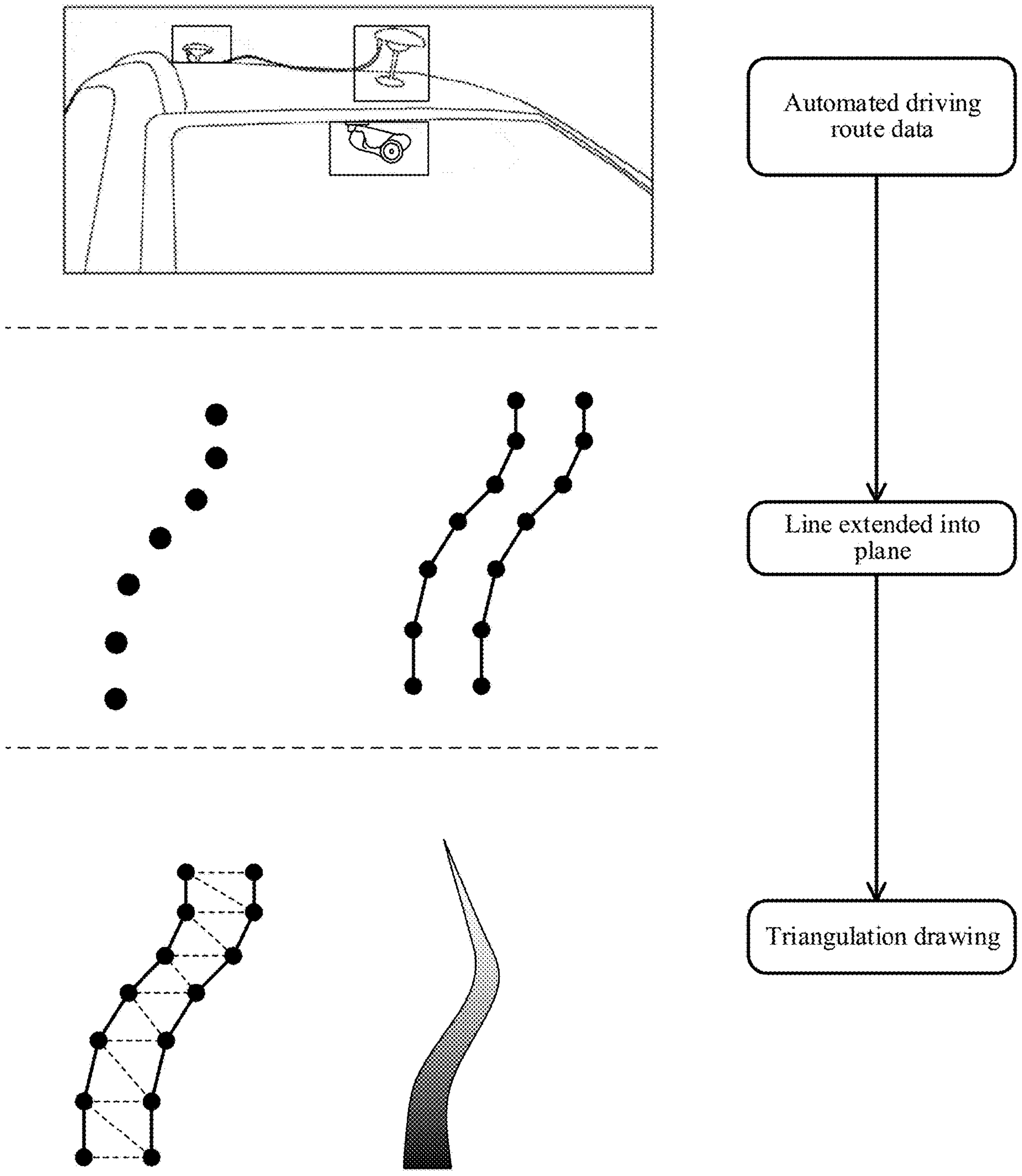
FIG. 19A is a flowchart of a lane change route area drawing method according to an embodiment of the present disclosure.

FIG. 19A is a flowchart of a lane change route area drawing method according to an embodiment of the present disclosure.

First, a lane change route planned for the current vehicle is obtained from the automated driving system, that is, a step of automated driving route data in FIG. 19A. The process is implemented based on the automated driving system, and the obtained lane change route may also be represented by using sampling points.

Further, a third width is extended in a third preset direction by using a location of the lane change route as a center, to obtain a lane change route area corresponding to the third automated driving state. The third preset direction is a direction perpendicular to the lane change route.

This step is a process of a line-extended-into-plane, and the third preset direction is a direction perpendicular to the lane change route. As shown in FIG. 19A, the location of the lane change route may be used as a center, and a d3 width is extended left and right to obtain a lane change route area.

In this embodiment of the present disclosure, the lane change route area may be superposed and drawn on the AR map in a triangulation drawing manner, and finally, 181 shown in FIG. 18 may be obtained.

Figure 19B:
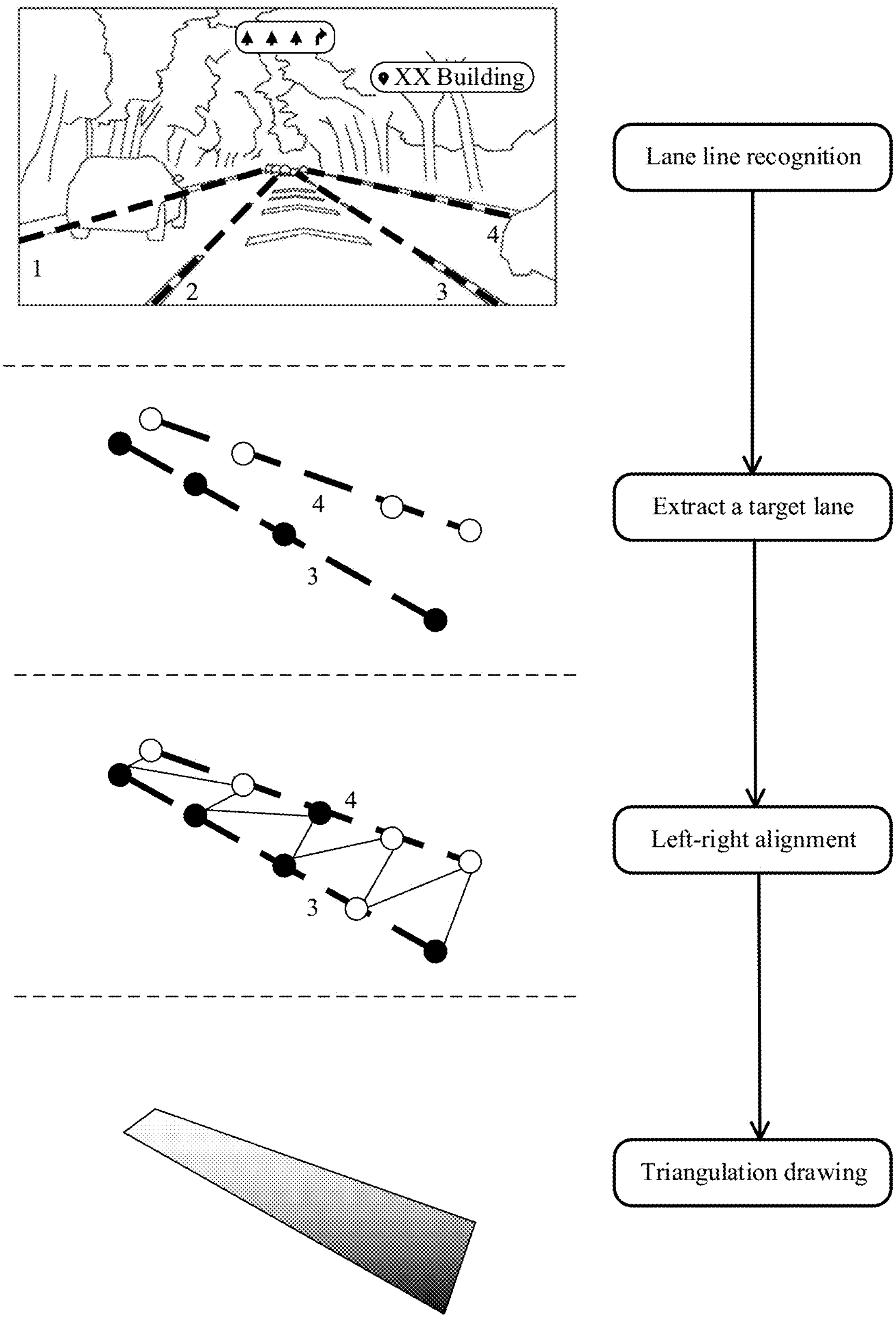
FIG. 19B is a flowchart of a target lane area drawing method according to an embodiment of the present disclosure.

FIG. 19B is a flowchart of a target lane area drawing method according to an embodiment of the present disclosure.

First, lane information of the current scene image obtained through lane line recognition is obtained. An example in which the lane information includes lane lines, for example, the lane line 1, the lane line 2, the lane line 3, and the lane line 4 that are marked in FIG. 19B corresponding to the lane line recognition process shown in FIG. 19B is used.

Further, based on the lane information, each lane line (that is, the lane line 3 and the lane line 4) of a target lane after lane change of the current vehicle is extracted, and each lane line of the target lane is sampled to obtain multiple second sampling points. Still using the foregoing as an example, the lane after lane change of the current vehicle is the lane formed by the lane line 3 and the lane line 4. In this process, the two lane lines included in the target lane need to be separately extracted, represented by multiple sampling points, and denoted as second sampling points. This corresponds to the process of extracting the target lane shown in FIG. 19B.

Further, the multiple obtained second sampling points are aligned, and a missing point is supplemented to obtain supplemented second sampling points, sampling points on each lane line in the supplemented second sampling points being corresponding to each other. As shown in the alignment step in FIG. 19B, the alignment may be left-right alignment in FIG. 19B.

Further, the target lane area corresponding to the third automated driving state is generated based on the supplemented second sampling points.

In this embodiment of the present disclosure, the target lane area may be superposed and drawn on the AR map in a triangulation drawing manner, and finally, 182 shown in FIG. 18 may be obtained.

Figure 19C:
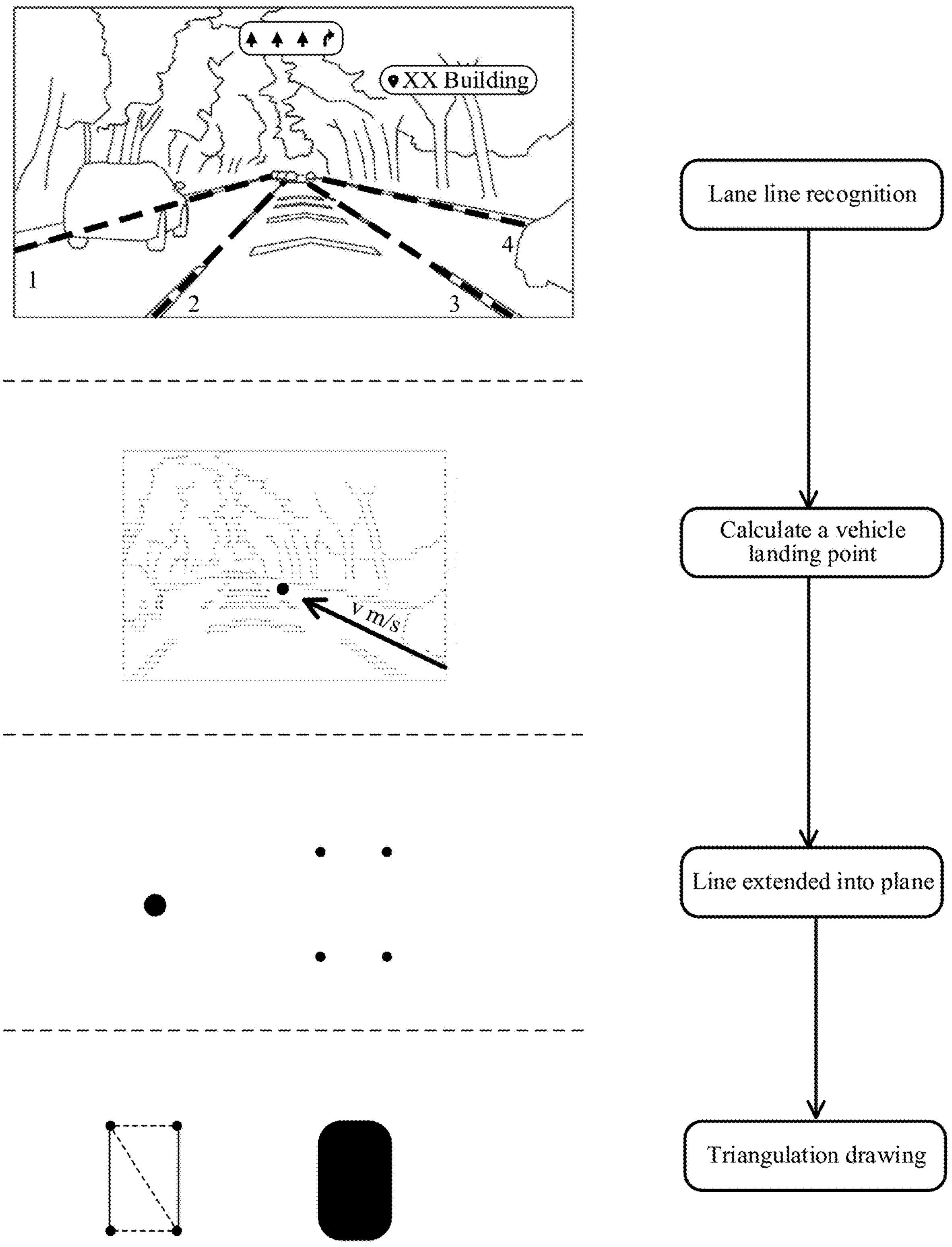
FIG. 19C is a flowchart of a vehicle landing area drawing method according to an embodiment of the present disclosure.

FIG. 19C is a flowchart of a vehicle landing area drawing method according to an embodiment of the present disclosure.

First, lane information of the current scene image obtained through lane line recognition is obtained. An example in which the lane information includes lane lines, for example, the lane line 1, the lane line 2, the lane line 3, and the lane line 4 that are marked in FIG. 19C corresponding to the lane line recognition process shown in FIG. 19C is used.

Further, based on the lane information, each lane line (that is, the lane line 3 and the lane line 4) of the target lane after lane change of the current vehicle is extracted, and each lane line of the target lane is sampled to obtain multiple second sampling points. Further, the multiple obtained second sampling points are aligned, and a missing point is supplemented to obtain supplemented second sampling points, sampling points on each lane line in the supplemented second sampling points being corresponding to each other. This is the same as the process of extracting the target lane in FIG. 19B, and details are not described again.

Then, the lane center line of the target lane is obtained based on the average value of groups of aligned second sampling points in the supplemented second sampling points, that is, the second sampling points corresponding to each group (that is, one sampling point on both the left and the right, that is, sampling points corresponding to corresponding locations in the lane line 3 and the lane line 4) are averaged to obtain corresponding center points, and then these center points are connected to form the lane center line of the target lane.

In the present disclosure, driving in the middle by the current vehicle is used as an example for description. Therefore, after the lane center line of the target lane is determined, a vehicle landing point location of the current vehicle on the lane center line of the target lane is determined according to a driving speed and preset lane change time of the current vehicle and the positioning location information of the current vehicle, that is, a process of calculating the vehicle landing point in FIG. 19C.

Further, based on the size of the current vehicle, the vehicle landing point location may be extended to a vehicle landing area corresponding to the third automated driving state, that is, the line-extended-into-plane process in FIG. 19C. The vehicle landing area may be set to a rectangle. For vehicles of different sizes, corresponding rectangle sizes are different, or the vehicle landing area may be set to another shape. This is not specifically limited in this specification. In FIG. 19C, a rectangle is used as an example for description.

In this embodiment of the present disclosure, the vehicle landing area may be superposed and drawn on the AR map in a triangulation drawing manner, and finally, 183 shown in FIG. 18 may be obtained.

In this embodiment of the present disclosure, highlighting styles corresponding to different vehicle driving states may be the same or different. The foregoing listed several highlighting styles are merely simple examples for description, and other highlighting styles are also encompassed within the scope of the present disclosure. In addition, in the present disclosure, styles of driving-state prompt elements drawn on the AR map are adjustable. A drawing state is also extensible and is not limited to a state enumerated in the present disclosure. For example, related driving-state prompt elements such as an automated driving road turn deceleration prompt, a stop-and-give-way prompt, a large-car avoidance prompt, an automated driving function exit prompt, a manual takeover prompt, and an abnormal state prompt may be presented in the AR map. Details are not described herein.

The foregoing AR map may be presented through screen projection. The following briefly describes a screen projection logic and a screen projection instance of the AR map in this embodiment of the present disclosure.

Figure 20A:
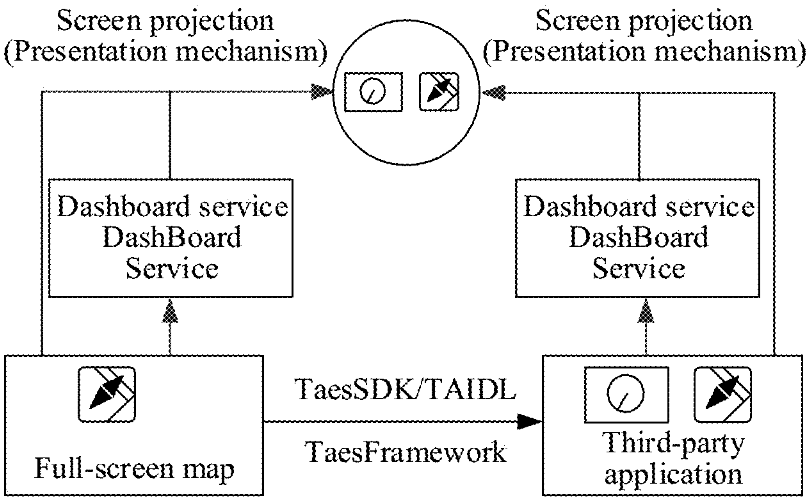
FIG. 20A is a schematic diagram of a screen projection logic according to an embodiment of the present disclosure.

FIG. 20A is a schematic diagram of a screen projection logic according to an embodiment of the present disclosure. FIG. 20A enumerates two screen projection solutions generated based on a presentation screen projection mechanism. There are two types of screen projection paths in the screen projection solution. The first solution is to create DashBoardService by using a related map. Then, the dashboard service projects a base picture (for example, the AR map in the present disclosure) on the dashboard screen for display by using the presentation screen projection mechanism. The second solution is that a related map application provides an interface for creating and operating a base picture. A software development kit (SDK) provided by a third party (a vehicle factory or a meter supplier) integrates the related map application to perform secondary development, create a dashboard service, and project the base picture to the dashboard screen for display.

Figure 20B:
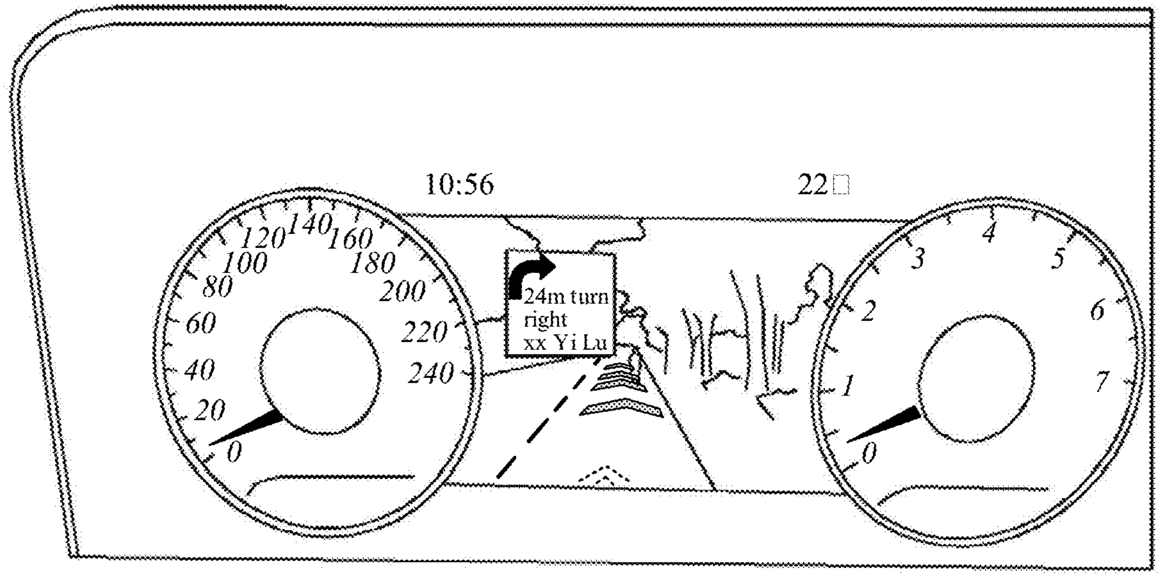
FIG. 20B is an effect diagram of an actual vehicle dashboard according to an embodiment of the present disclosure.

Based on the foregoing enumerated screen projection solutions, the AR map in the present disclosure may be projected to the display screen on the current vehicle or another related display screen. The foregoing enumerated dashboard screen is used as an example. FIG. 20B is an effect diagram of an actual vehicle dashboard according to an embodiment of the present disclosure. FIG. 20B shows an effect diagram of displaying an AR map on a dashboard screen. Certainly, a display effect on another display screen is similar, and details are not described one by one in this embodiment of the present disclosure.

Figure 20C:
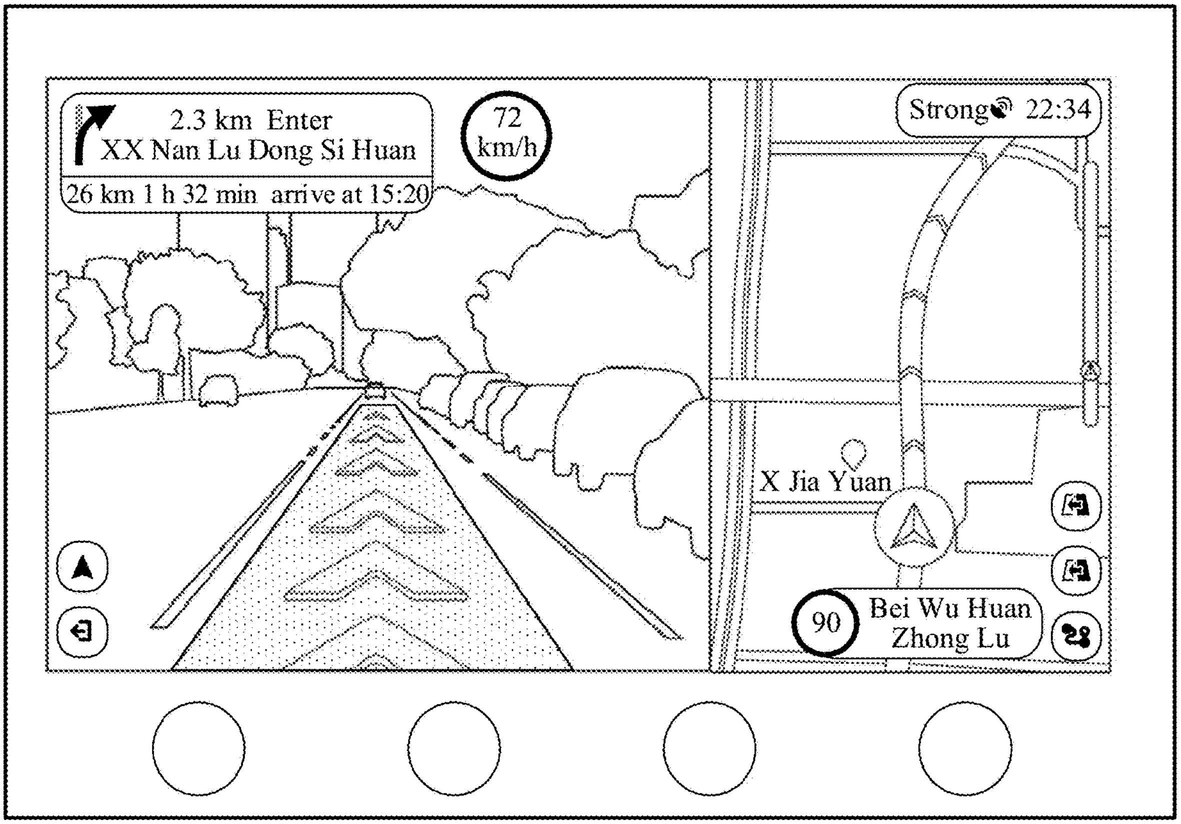
FIG. 20C is an effect diagram of an actual vehicle center console screen according to an embodiment of the present disclosure.
Figure 20D:
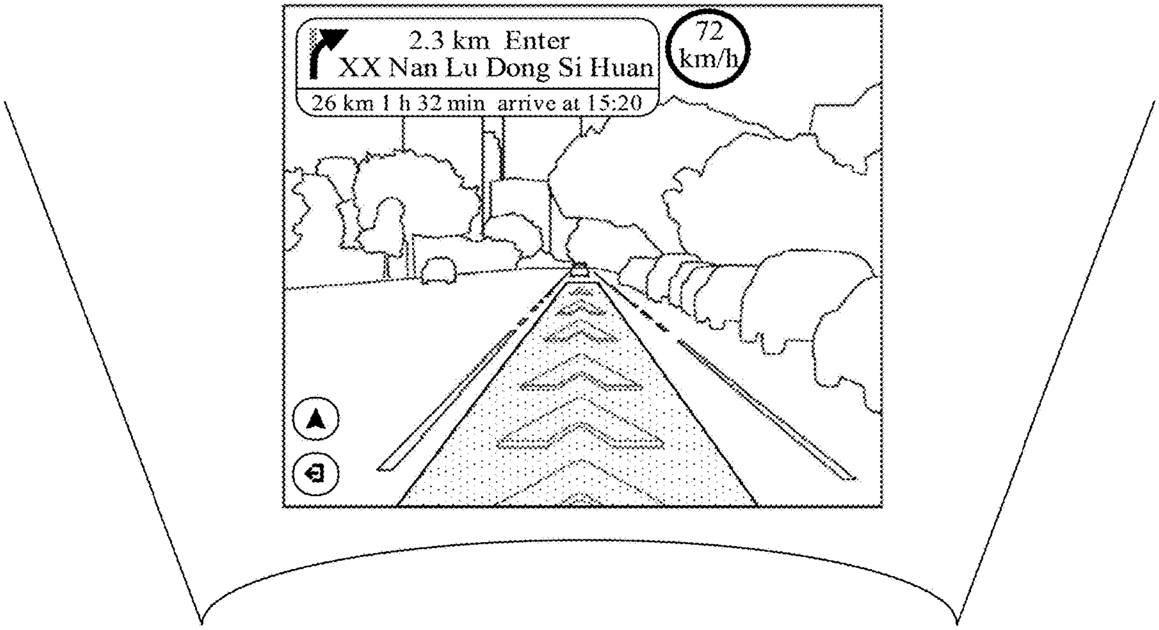
FIG. 20D is an effect diagram of an actual vehicle AR-HUD screen according to an embodiment of the present disclosure.

As shown in FIG. 20C and FIG. 20D, FIG. 20C is an effect diagram of an actual vehicle center console screen according to an embodiment of the present disclosure, and FIG. 20D is an effect diagram of an actual vehicle AR-HUD screen according to an embodiment of the present disclosure. The right part of the AR map enumerated in FIG. 20C is an SD navigation interface. Certainly, the navigation interface may also be displayed on the left. In addition, the AR-HUD enumerated in FIG. 20D may further display an SD navigation interface. This is not specifically limited in this specification.

In this embodiment of the present disclosure, through multi-dimensional data fusion, an automated driving system state is fused with AR sensed environment information, and a virtual-real fusion target is implemented. In addition, only simple and efficient data processing needs to be performed, and fast and accurate calculation is performed, so that an optimal display effect and performance can be obtained.

Figure 21:
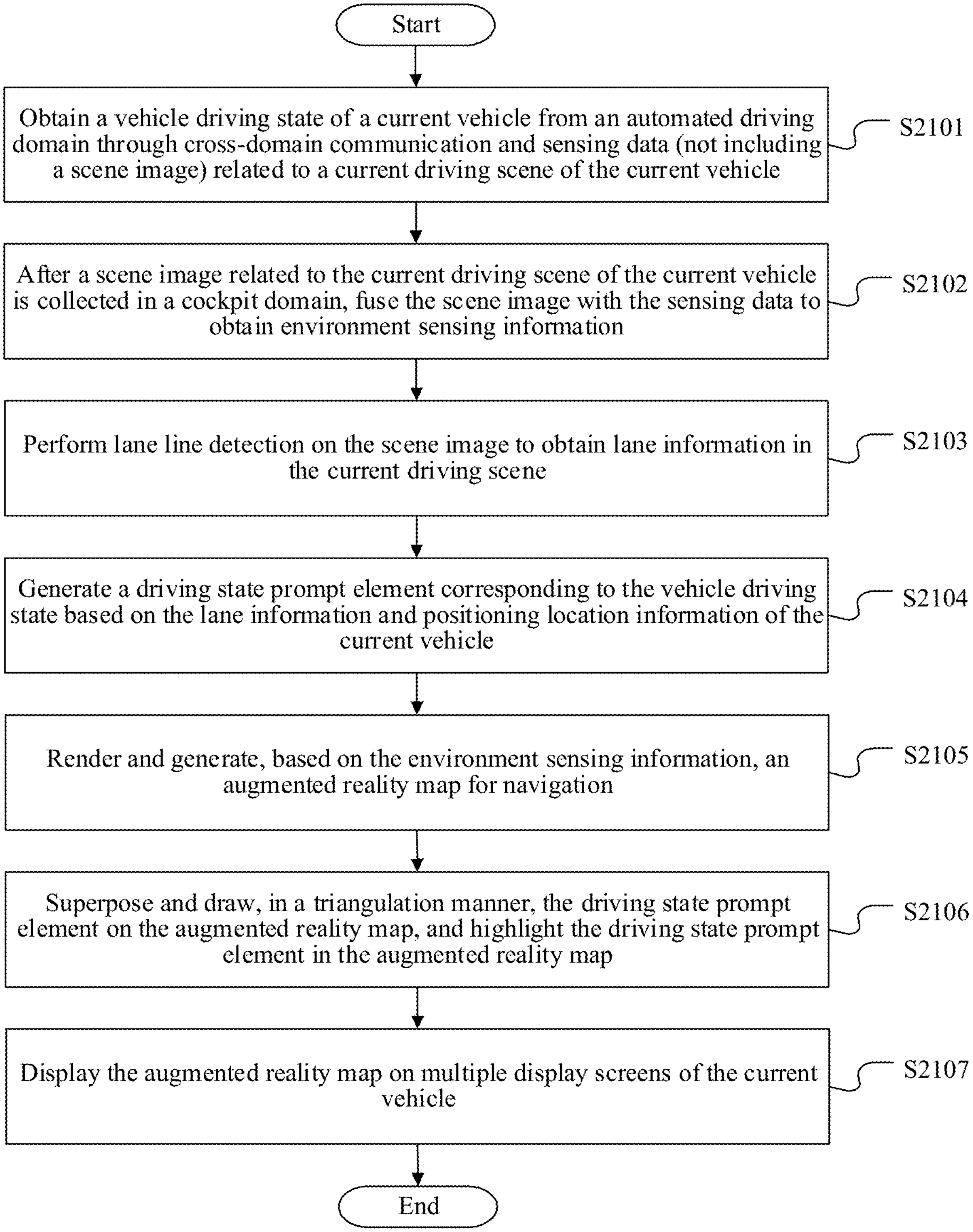
FIG. 21 is a schematic flowchart of specific display of a vehicle driving state according to an embodiment of the present disclosure.

FIG. 21 is a schematic flowchart of specific display of a vehicle driving state according to an embodiment of the present disclosure. An example in which an execution body is a terminal device is used. A specific implementation procedure of the method is as follows:

S2101: Obtain a vehicle driving state of a current vehicle from an automated driving domain through cross-domain communication and sensing data (not including a scene image) related to a current driving scene of the current vehicle.

S2102: After a scene image related to the current driving scene of the current vehicle is collected in a cockpit domain, fuse the scene image with the sensing data to obtain environment sensing information.

S2103: Perform lane line detection on the scene image to obtain lane information in the current driving scene.

S2104: Generate a driving-state prompt element corresponding to the vehicle driving state based on the lane information and positioning location information of the current vehicle.

S2105: Render and generate, based on the environment sensing information, an augmented reality map for navigation.

S2106: Superpose and draw, in a triangulation manner, the driving-state prompt element on the augmented reality map, and highlight the driving-state prompt element in the augmented reality map.

S2107: Display the augmented reality map on multiple display screens of the current vehicle.

Figure 22:
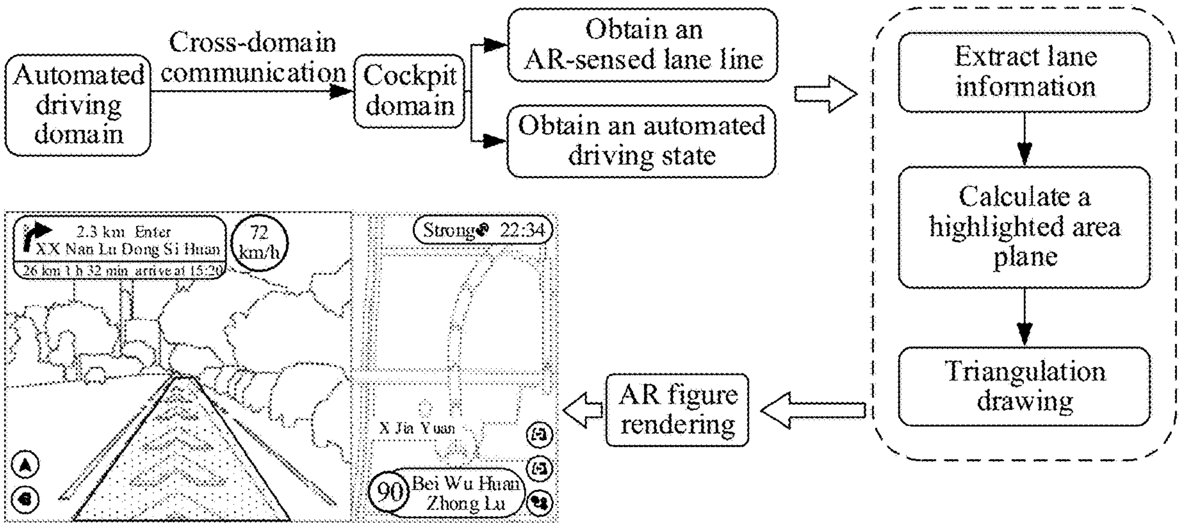
FIG. 22 is a schematic diagram of a generation logic of an AR map according to an embodiment of the present disclosure.

FIG. 22 is a schematic diagram of a generation logic of an AR map according to an embodiment of the present disclosure. In summary, the solution in the present disclosure may be implemented through cross-domain communication. First, automated driving state information is obtained from the automated driving domain through cross-domain communication between the automated driving domain and the cockpit domain. After receiving the foregoing information, the cockpit domain obtains an AR-sensed lane line from an AR sensing system to generate lane information, and further calculates, based on the extracted lane information and with reference to the foregoing obtained automated driving state, a related highlighted area plane (that is, a corresponding driving-state prompt element). Further, through triangulation drawing and AR figure rendering, an effect of drawing the automated driving state information on the AR figure with reference to the ego vehicle state can be implemented, and the AR map finally shown in FIG. 22 is generated.

Figure 23:
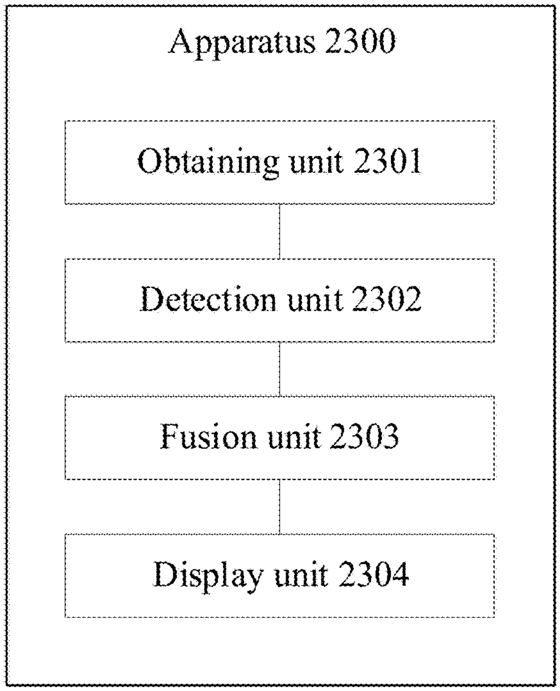
FIG. 23 is a schematic structural diagram of composition of an apparatus for displaying vehicle driving state according to an embodiment of the present disclosure.

Based on the same/similar inventive concept(s), an embodiment of the present disclosure further provides a apparatus for displaying vehicle driving state. FIG. 23 is a schematic structural diagram of a vehicle driving state display apparatus 2300. The apparatus may include:

an obtaining unit 2301, configured to obtain a vehicle driving state of a current vehicle, and obtain environment sensing information related to a current driving scene of the current vehicle;

the environment sensing information including a scene image of the current driving scene; a detection unit 2302, configured to perform lane line detection on the scene image to obtain lane information in the current driving scene;

a fusion unit 2303, configured to: generate a driving-state prompt element corresponding to the vehicle driving state based on the lane information, and perform superposed fusion on the driving-state prompt element and the environment sensing information to render and generate an augmented reality map; and a display unit 2304, configured to display the augmented reality map.

In one embodiment, the obtaining unit 2301 is specifically configured to:

obtain, through cross-domain communication between a driving domain of the current vehicle and an automated driving domain of the current vehicle, the vehicle driving state of the current vehicle from the automated driving domain.

In one embodiment, the automated driving domain includes an environment sensing device; and the obtaining unit 2301 is further configured to collect, by using the automated driving domain, sensing data measured by the environment sensing device;

transmit the sensing data from the automated driving domain to the cockpit domain by using the cross-domain communication; and determine the environment sensing information based on the sensing data obtained in the cockpit domain.

In one embodiment, if the sensing data does not include a scene image, the obtaining unit 2301 is further configured to:

collect, by using the cockpit domain, a scene image related to the current driving scene of the current vehicle; and perform fusion based on the scene image and the sensing data to obtain the environment sensing information.

In one embodiment, the environment sensing information further includes positioning location information of the current vehicle; and the fusion unit 2303 is specifically configured to:

render, in the cockpit domain based on the positioning location information of the current vehicle, other information in the environment sensing information to generate an augmented reality map used for navigation, the other information being information in the environment sensing information except the positioning location information; and superpose and draw, in a triangulation manner, the driving-state prompt element on the augmented reality map, and highlight the driving-state prompt element in the augmented reality map.

In one embodiment, the fusion unit 2303 is further configured to: before the other information in the environment sensing information is rendered based on the positioning location information of the current vehicle to generate the augmented reality map used for navigation, correct, in the cockpit domain, the positioning location information of the current vehicle with reference to augmented reality navigation information for the current vehicle. The fusion unit 2303 is specifically configured to render, based on the corrected positioning location information, the other information in the environment sensing information to generate an augmented reality map used for navigation.

In one embodiment, the cockpit domain includes a display screen; and the display unit 2304 is specifically configured to:

display the augmented reality map on the display screen included in the cockpit domain.

In one embodiment, the driving-state prompt element is prompt information that matches a function of the vehicle driving state;

when the vehicle driving state is a manual driving state, the driving-state prompt element includes a drivable lane plane corresponding to a lane in which the current vehicle is currently located;

when the vehicle driving state is a first automated driving state, the driving-state prompt element includes a lane line area corresponding to the lane in which the current vehicle is currently located; the first automated driving state is a lane center control enabled state;

when the vehicle driving state is a second automated driving state, the driving-state prompt element includes a lane central area corresponding to the lane in which the current vehicle is currently located; the second automated driving state is a navigate on autopilot enabled state;

when the vehicle driving state is a third automated driving state, the driving-state prompt element includes at least one of a lane change route area, a target lane area after lane change, and a vehicle landing area; the third automated driving state is an automatic lane change state; and the vehicle landing area is used for representing a location of the current vehicle in a target lane in a case of changing to the target lane.

In one embodiment, the vehicle driving state is the manual driving state; and the fusion unit 2303 is specifically configured to:

determine, based on the positioning location information of the current vehicle, the lane in which the current vehicle is currently located from the lane information, and sample each lane line of the lane in which the current vehicle is currently located to obtain multiple first sampling points;

align the multiple first sampling points, and supplement a missing point to obtain supplemented first sampling points, sampling points on each lane line in the supplemented first sampling points being corresponding to each other; and generate a drivable lane plane corresponding to the manual driving state based on the supplemented first sampling points.

In one embodiment, the vehicle driving state is the first automated driving state; and the fusion unit 2303 is specifically configured to:

extract, from the lane information based on the positioning location information of the current vehicle, each lane line of the lane in which the current vehicle is currently located; and separately extend by a first width in a first preset direction by using a location of each lane line as a center, to obtain a lane line area corresponding to the first automated driving state; the first preset direction being a direction perpendicular to the lane line.

In one embodiment, the vehicle driving state is the second automated driving state; and the fusion unit 2303 is specifically configured to:

determine, based on the positioning location information of the current vehicle, the lane in which the current vehicle is currently located from the lane information, and sample each lane line of the lane in which the current vehicle is currently located to obtain multiple first sampling points;

align the multiple first sampling points, and supplement a missing point to obtain supplemented first sampling points, sampling points on each lane line in the supplemented first sampling points being corresponding to each other;

obtain a lane center line of the current lane based on an average value of groups of aligned first sampling points in the supplemented first sampling points; and extend by a second width in a second preset direction by using a location of the lane center line of the current lane as a center, to obtain a lane center area corresponding to the second automated driving state; the second preset direction being a direction perpendicular to the lane center line.

In one embodiment, the vehicle driving state is the third automated driving state; the driving-state prompt element includes the lane change route area; and the fusion unit 2303 is specifically configured to:

obtain, from an automated driving system, a lane change route planned for the current vehicle; and extend by a third width in a third preset direction by using a location of the lane change route as a center, to obtain a lane change route area corresponding to the third automated driving state; the third preset direction being a direction perpendicular to the lane change route.

In one embodiment, the vehicle driving state is the third automated driving state; the driving-state prompt element includes the target lane area; and the fusion unit 2303 is specifically configured to:

extract, based on the lane information, each lane line of a target lane after lane change of the current vehicle, and sample each lane line of the target lane to obtain multiple second sampling points;

align the multiple second sampling points, and supplement a missing point to obtain supplemented second sampling points, sampling points on each lane line in the supplemented second sampling points being corresponding to each other; and generate a target lane area corresponding to the third automated driving state based on the supplemented second sampling points.

In one embodiment, the vehicle driving state is the third automated driving state; the driving-state prompt element includes the vehicle landing area; and the fusion unit 2303 is specifically configured to:

extract, based on the lane information, each lane line of a target lane after lane change of the current vehicle, and sample each lane line of the target lane to obtain multiple second sampling points;

align the multiple second sampling points, and supplement a missing point to obtain supplemented second sampling points, sampling points on each lane line in the supplemented second sampling points being corresponding to each other;

obtain a lane center line of the target lane based on an average value of groups of aligned second sampling points in the supplemented second sampling points;

determine a vehicle landing point location of the current vehicle on the lane center line of the target lane according to a driving speed and preset lane change time of the current vehicle and the positioning location information of the current vehicle; and extend, based on a size of the current vehicle, the vehicle landing point location to a vehicle landing area corresponding to the third automated driving state.

As disclosed, high-precision map data is discarded, and only a vehicle driving state and related environment sensing information need to be obtained, to perform lane line detection on a scene image to obtain lane information in a current driving scene, for generating a driving-state prompt element corresponding to the vehicle driving state based on the lane information. The driving-state prompt element is prompt information that matches a function of the vehicle driving state, and may reflect the vehicle driving state. Therefore, the driving-state prompt element is superposed and fused with the environment sensing information, and rendered to generate an augmented reality map for display. In this way, the vehicle driving state is displayed, and an automated driving behavior can be displayed in multiple dimensions for associated objects of the vehicle to view separately. The high-precision map data is discarded in a vehicle driving process, but an augmented reality map is rendered and generated based on a vehicle driving state and environment sensing information, thereby implementing lightweight drawing, reducing performance consumption, and improving drawing efficiency. In addition, in this process, the environment sensing information is used as a fusion basis, and a scene image of a real scene and the vehicle driving state are fused by using an augmented reality technology, for presenting a mapping result of sensing data and the real world, which reflects a correlation between a real environment and the driving state.

For convenience of description, the foregoing parts are divided into modules (or units) for description by function. Certainly, in implementation of the present disclosure, the functions of the modules (or units) may be implemented in the same piece of or a plurality of pieces of software and/or hardware.

A person skilled in the art can understand that the aspects of the present disclosure may be implemented as systems, methods, or program products. Therefore, the aspects of the present disclosure may be specifically embodied in the following forms: hardware only implementations, software only implementations (including firmware, micro code, etc.), or implementations with a combination of software and hardware, which are collectively referred to as "circuit", "module", or "system" herein.

Figure 24:
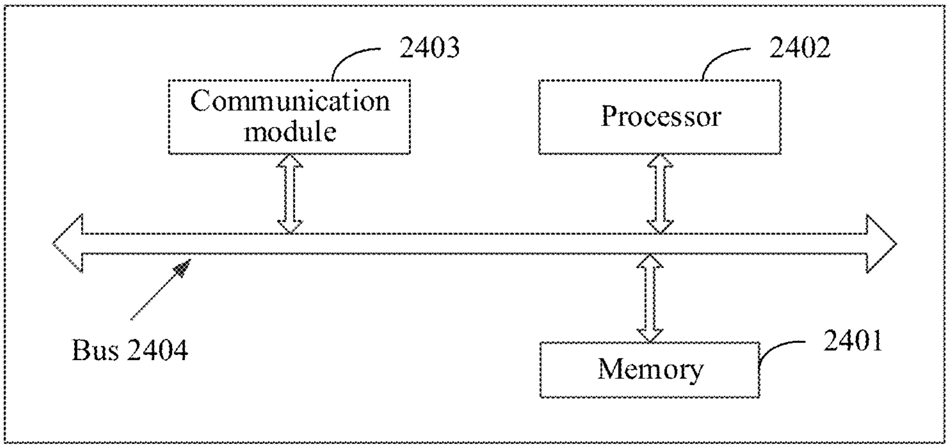
FIG. 24 is a schematic structural diagram of hardware composition of an electronic device applied to an embodiment of the present disclosure.

Based on the same inventive concept as the foregoing method embodiment, an embodiment of the present disclosure further provides an electronic device. In an embodiment, the electronic device may be a server, such as the server 120 shown in FIG. 1. In this embodiment, a structure of the electronic device may be shown in FIG. 24, including a memory 2401, a communication module 2403, and one or more processors 2402.

The memory 2401 is configured to store a computer program executed by the processor 2402. The memory 2401 may mainly include a program storage area and a data storage area, where the program storage area may store an operating system, a program required for running an instant messaging function, and the like. The data storage area can store various instant messaging information and operation instruction sets.

The memory 2401 may be a volatile memory such as a random access memory (RAM); the memory 2401 may alternatively be a non-volatile memory such as a read-only memory, a flash memory, a hard disk drive (HDD), or a solid-state drive (SSD); or the memory 2401 is any other medium that can be used for carrying or storing an expected computer program in the form of an instruction or data structure and that can be accessed by a computer, but is not limited thereto. The memory 2401 may be a combination of the foregoing memories.

The processor 2402 may include one or more central processing units (CPU), a digital processing unit, or the like. The processor 2402 is configured to: when invoking the computer program stored in the memory 2401, implement the foregoing vehicle driving state display method.

The communication module 2403 is configured to communicate with a terminal device and another server.

A specific connection medium among the memory 2401, the communication module 2403, and the processor 2402 is not limited in this embodiment of the present disclosure. In this embodiment of the present disclosure, the memory 2401 is connected to the processor 2402 by using a bus 2404 in FIG. 24. The bus 2404 is described by using a bold line in FIG. 24. A connection manner between other components is merely a schematic description, and is not limiting. The bus 2404 may be classified into an address bus, a data bus, a control bus, and the like. For ease of description, in FIG. 24, only one bold line is used for description, but this does not mean that only one bus or one type of bus exists.

The memory 2401 stores a computer storage medium, the computer storage medium stores computer executable instructions, and the computer executable instructions are used for implementing the vehicle driving state display method in the embodiment of the present disclosure. The processor 2402 is configured to perform the foregoing vehicle driving state display method, as shown in FIG. 2.

Figure 25:
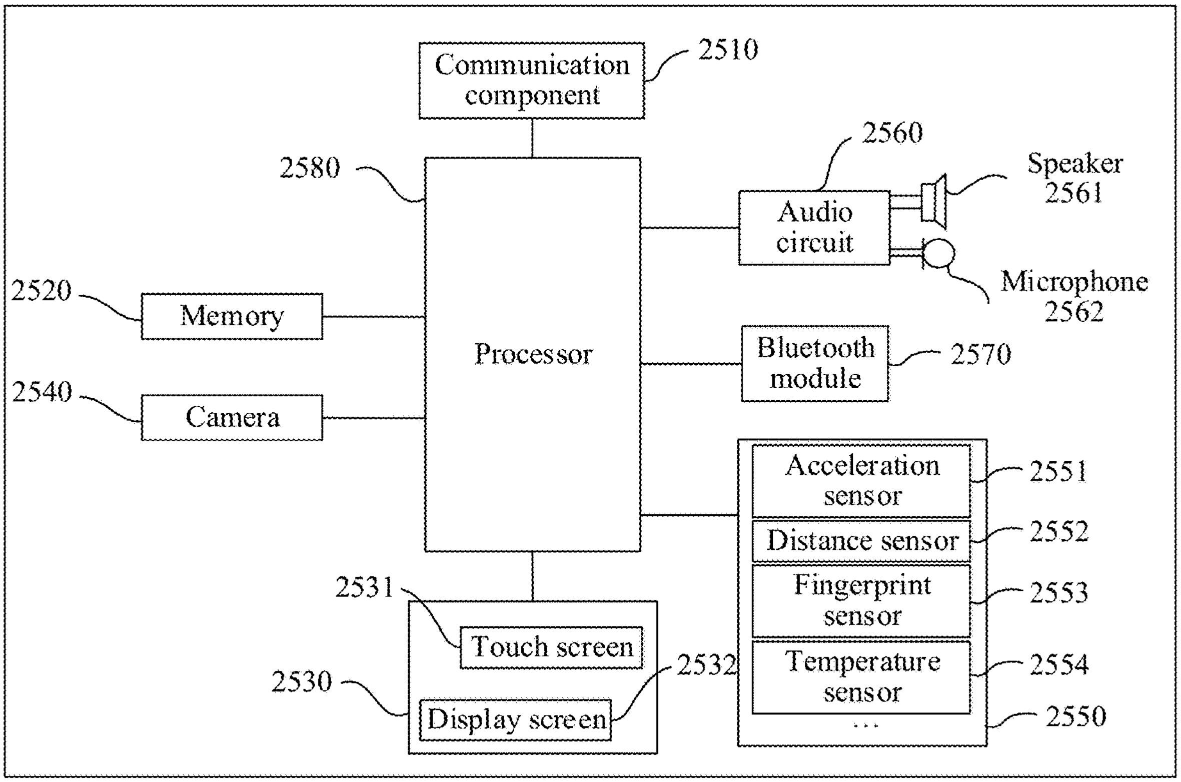
FIG. 25 is a schematic structural diagram of hardware composition of another electronic device applied to an embodiment of the present disclosure.

In another embodiment, the electronic device may alternatively be another electronic device, such as the terminal device 110 shown in FIG. 1. In this embodiment, the structure of the electronic device may be shown in FIG. 25, including: a communication component 2510, a memory 2520, a display unit 2530, a camera 2540, a sensor 2550, an audio circuit 2560, a Bluetooth module 2570, a processor 2580, and the like. The display unit 2530 may include a touch screen 2531 and a display screen 2532. The sensor 2550 may be, for example, an acceleration sensor 2551, a distance sensor 2552, a fingerprint sensor 2553, a temperature sensor 2554, or the like. The audio circuit 2560 may include a speaker 2561 and a microphone 2562.

The memory 2520 may be configured to store a software program and data. The processor 2580 runs the software program and the data stored in the memory 2520, to implement various functions and data processing of the terminal device 110. The memory 2520 may include a high speed random access memory, and may also include a non-volatile memory, such as at least one magnetic disk storage device, a flash memory, or another volatile solid-state storage device. The memory 2520 stores an operating system that enables the terminal device 110 to run. In the present disclosure, the memory 2520 may store the operating system and various application programs, and may further store a computer program that executes the vehicle driving state display method in the embodiment of the present disclosure.

The processor 2580 is a control center of the terminal device, is connected to each part of the entire terminal by using various interfaces and lines, and performs various functions and data processing of the terminal device by running or executing the software program stored in the memory 2520 and invoking the data stored in the memory 2520. In some embodiments, the processor 2580 may include one or more processing units. The processor 2580 may further integrate an application processor and a baseband processor, where the application processor mainly processes an operating system, a user interface, an application program, and the like, and the baseband processor mainly processes wireless communication. It may be understood that the baseband processor may alternatively not be integrated into the processor 2580. In the present disclosure, the processor 2580 may run an operating system and an application program and display a user interface and a touch response, and the vehicle driving state display method in the embodiment of the present disclosure. In addition, the processor 2580 is coupled to the display unit 2530.

In some possible implementations, aspects of the vehicle driving state display method provided in the present disclosure may further be implemented in a form of a program product. The program product includes a computer program. When running on an electronic device, the computer program is configured to enable the electronic device to perform the steps described in the foregoing description in the vehicle driving state display method according to various exemplary implementations of the present disclosure. For example, the electronic device may perform the steps shown in FIG. 2.

As such, embodiments of the present disclosure provide a vehicle driving state display method and apparatus, an electronic device, and a storage medium. As disclosed, high-precision map data is discarded, and only a vehicle driving state and related environment sensing information need to be obtained, to perform lane line detection on a scene image to obtain lane information in a current driving scene, for generating a driving-state prompt element corresponding to the vehicle driving state based on the lane information. The driving-state prompt element is prompt information that matches a function of the vehicle driving state, and may reflect the vehicle driving state. Therefore, the driving-state prompt element is superposed and fused with the environment sensing information, and rendered to generate an augmented reality map for display. In this manner, the vehicle driving state is displayed, and an automated driving behavior can be displayed in multiple dimensions for associated objects of the vehicle to view separately. As disclosed, high-precision map data is discarded in a vehicle driving process, but an augmented reality map is rendered and generated based on a vehicle driving state and environment sensing information, thereby implementing lightweight drawing, reducing performance consumption, and improving drawing efficiency. In addition, in this process, the environment sensing information is used as a fusion basis, and a scene image of a real scene and the vehicle driving state are fused by using an augmented reality technology, presenting a mapping result of sensing data and the real world, which reflects a correlation between a real environment and the driving state.

The program product may be any combination of one or more readable mediums. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (non-exhaustive lists) of the readable storage medium include: an electrical connection having one or more wires, a portable disk, a hard disk, a random access memory (RAM), a read-only memory (ROM), an erasable programmable read-only memory (EPROM), an optical fiber, a portable compact disk read-only memory (CD-ROM), an optical storage device, a magnetic storage device, or any appropriate combination thereof.

The program product in the implementation of the present disclosure may use a portable compact disk read-only memory (CD-ROM) and include a computer program, and may run on an electronic device. However, the program product in the present disclosure is not limited thereto. In this specification, the readable storage medium may be any tangible medium including or storing a program, and the program may be used by or used in combination with an instruction execution system, apparatus, or device.

A readable signal medium may include a data signal being in a baseband or transmitted as a part of a carrier, which carries a computer-readable program. A data signal propagated in such a way may assume a plurality of forms, including, but not limited to, an electromagnetic signal, an optical signal, or any appropriate combination thereof. The readable storage medium may alternatively be any readable medium other than a readable storage medium, and the readable medium may send, propagate, or transmit a program used by or in combination with an instruction execution system, apparatus, or device.

The computer program included in the readable medium may be transmitted by using any suitable medium, including but not limited to wireless, wired, optical cable, RF, or the like, or any suitable combination thereof.

A computer program used for performing operations of the present disclosure may be compiled in any combination of one or more programming languages. The programming language includes an object-oriented programming language such as java, C++, or the like, and further includes a conventional programming language such as a "C" language or a similar programming language. The computer program may be completely executed on a user electronic device, partially executed on the user electronic device, executed as an independent software package, partially executed on a remote electronic device, or completely executed on the remote electronic device or a server. In a case involving a remote electronic device, the remote electronic device may be connected to a user electronic device by using any type of network, including a local area network (LAN) or a wide area network (WAN), or may be connected to an external electronic device (for example, connected by using an Internet service provider through the Internet).

Although several units or subunits of the apparatus are mentioned in the foregoing detailed description, such division is merely exemplary and not mandatory. Actually, according to the implementations of the present disclosure, the features and functions of two or more units described above may be specifically implemented in one unit. On the contrary, the features and functions of one unit described above may be further divided to be embodied by a plurality of units.

In addition, although operations of the methods of the present disclosure are described in a specific order in the accompanying drawings, this does not require or imply that these operations must be performed in the specific order, or that all the operations shown must be performed to achieve an expected result. Additionally or alternatively, some steps may be omitted, multiple steps are combined into one step for execution, and/or one step is decomposed into multiple steps for execution.

A person skilled in the art can understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may be in a form of a computer program product implemented on one or more computer-available storage media (including but not limited to a magnetic disk memory, a CD-ROM, an optical memory, and the like) that include a computer-available computer program.

The present disclosure is described with reference to flowcharts and/or block diagrams of the method, the device (system), and the computer program product according to the embodiments of the present disclosure. It is to be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

Although exemplary embodiments of the present disclosure have been described, once persons skilled in the art know the basic creative concept, they can make additional changes and modifications to these embodiments. Therefore, the following claims are intended to be construed as to cover the exemplary embodiments and all changes and modifications falling within the scope of the present disclosure.

Clearly, a person skilled in the art can make various modifications and variations to the present disclosure without departing from the spirit and scope of the present disclosure. In this case, if the modifications and variations made to the present disclosure fall within the scope of the claims of the present disclosure and their equivalent technologies, the present disclosure is intended to include these modifications and variations.

What is claimed is:

1. A method for displaying vehicle driving state, performed by an electronic device comprising at least one processor, and the method comprising:

obtaining, from an automated driving domain through cross-domain communication between a cockpit domain of a current vehicle and the automated driving domain of the current vehicle, a vehicle driving state of the current vehicle coupled to the electronic device, and obtaining environment sensing information related to a current driving scene of the current vehicle, the environment sensing information comprising a scene image of the current driving scene, wherein the cockpit domain and the automated driving domain are two relatively independent processing systems, and the cross-domain communication is performed based on an in-vehicle data transmission protocol;

performing, by the at least one processor, lane line detection on the scene image to obtain lane information in the current driving scene;

generating, by the at least one processor, a driving-state prompt element corresponding to the vehicle driving state based on the lane information, and performing superposed fusion on the driving-state prompt element and the environment sensing information to render and generate an augmented reality map; and displaying, on a display screen of the cockpit domain, the augmented reality map, the display screen comprising at least one of an augmented reality head up screen, a dashboard screen, or a center console screen, the displaying comprising:

in response to the vehicle driving state being a manual driving state, displaying the driving-state prompt element that includes a drivable lane plane corresponding to a first lane, the first lane being a lane in which the current vehicle is currently located;

in response to the vehicle driving state being a lane center control enabled state, displaying the driving-state prompt element that includes a lane line area corresponding to the first lane;

in response to the vehicle driving state being a navigate on autopilot enabled state, displaying the driving-state prompt element that includes a lane central area corresponding to the first lane; and in response to the vehicle driving state being an automatic lane change state, displaying the driving-state prompt element that includes at least one of: a lane change route area, a target lane area after lane change, or a vehicle landing area, the vehicle landing area representing a location of the current vehicle in a target lane upon changing to the target lane.

2. The method according to claim 1, wherein obtaining the vehicle driving state of the current vehicle comprises:

obtaining, through cross-domain communication between a driving domain of the current vehicle and an automated driving domain of the current vehicle, the vehicle driving state of the current vehicle from the automated driving domain.

3. The method according to claim 2, wherein the automated driving domain comprises an environment sensing device, and obtaining the environment sensing information related to the current driving scene of the current vehicle comprises:

collecting, by using the automated driving domain, sensing data measured by the environment sensing device;

transmitting the sensing data from the automated driving domain to a cockpit domain using the cross-domain communication; and determining the environment sensing information based on the sensing data obtained in the cockpit domain.

4. The method according to claim 3, wherein determining the environment sensing information based on the sensing data obtained in the cockpit domain comprises:

collecting, using the cockpit domain, the scene image related to the current driving scene of the current vehicle; and performing fusion based on the scene image and the sensing data to obtain the environment sensing information.

5. The method according to claim 2, wherein the environment sensing information further comprises positioning location information of the current vehicle; and performing the superposed fusion on the driving-state prompt element and the environment sensing information to render and generate the augmented reality map comprises:

rendering, in the cockpit domain based on the positioning location information of the current vehicle, other information in the environment sensing information to generate the augmented reality map used for navigation, the other information being information in the environment sensing information except the positioning location information; and superposing and drawing, in a triangulation manner, the driving-state prompt element on the augmented reality map, and highlighting the driving-state prompt element in the augmented reality map.

6. The method according to claim 5, further comprising:

correcting, in the cockpit domain, the positioning location information of the current vehicle with reference to augmented reality navigation information for the current vehicle; and rendering the other information in the environment sensing information to generate the augmented reality map used for navigation comprises:

rendering, based on the corrected positioning location information, the other information in the environment sensing information to generate the augmented reality map used for navigation.

7. The method according to claim 2, wherein the cockpit domain comprises a display screen; and displaying the augmented reality map comprises:

displaying the augmented reality map on the display screen comprised in the cockpit domain.

8. The method according to claim 1, wherein the vehicle driving state is the manual driving state; and generating the driving-state prompt element corresponding to the vehicle driving state based on the lane information comprises:

determining, based on the positioning location information of the current vehicle, the lane in which the current vehicle is currently located from the lane information, and sampling a lane line of the lane in which the current vehicle is currently located to obtain multiple first sampling points;

aligning the multiple first sampling points, and supplementing a missing point to obtain supplemented first sampling points, sampling points on the lane line in the supplemented first sampling points being corresponding to each other; and generating a drivable lane plane corresponding to the manual driving state based on the supplemented first sampling points.

9. The method according to claim 1, wherein the vehicle driving state is the lane center control enabled state; and generating the driving-state prompt element corresponding to the vehicle driving state based on the lane information comprises:

extracting, from the lane information based on the positioning location information of the current vehicle, a lane line of the lane in which the current vehicle is currently located; and separately extending by a first width in a first preset direction by using a location of the lane line as a center, to obtain a lane line area corresponding to the lane center control enabled state; the first preset direction being a direction perpendicular to the lane line.

10. The method according to claim 1, wherein the vehicle driving state is the navigate on autopilot enabled state; and generating the driving-state prompt element corresponding to the vehicle driving state based on the lane information comprises:

determining, based on the positioning location information of the current vehicle, the lane in which the current vehicle is currently located from the lane information, and sampling a lane line of the lane in which the current vehicle is currently located to obtain multiple first sampling points;

aligning the multiple first sampling points, and supplementing a missing point to obtain supplemented first sampling points, sampling points on the lane line in the supplemented first sampling points being corresponding to each other;

obtaining a lane center line of the current lane based on an average value of groups of aligned first sampling points in the supplemented first sampling points; and extending by a second width in a second preset direction by using a location of the lane center line of the current lane as a center, to obtain a lane center area corresponding to the navigate on autopilot enabled state, and the second preset direction being a direction perpendicular to the lane center line.

11. The method according to claim 1, wherein the vehicle driving state is the automatic lane change state; and the driving-state prompt element comprises the lane change route area; and generating the driving-state prompt element corresponding to the vehicle driving state based on the lane information comprises:

obtaining, from an automated driving system, a lane change route planned for the current vehicle; and extending by a third width in a third preset direction by using a location of the lane change route as a center, to obtain a lane change route area corresponding to the automatic lane change state, the third preset direction being a direction perpendicular to the lane change route.

12. The method according to claim 1, wherein the vehicle driving state is the automatic lane change state; the driving-state prompt element comprises the target lane area; and generating the driving-state prompt element corresponding to the vehicle driving state based on the lane information comprises:

extracting, based on the lane information, a lane line of a target lane after lane change of the current vehicle, and sampling the lane line of the target lane to obtain multiple second sampling points;

aligning the multiple second sampling points, and supplementing a missing point to obtain supplemented second sampling points, sampling points on a lane line in the supplemented second sampling points being corresponding to each other; and generating a target lane area corresponding to the automatic lane change state based on the supplemented second sampling points.

13. The method according to claim 1, wherein the vehicle driving state is the automatic lane change state; the driving-state prompt element comprises the vehicle landing area; and generating the driving-state prompt element corresponding to the vehicle driving state based on the lane information comprises:

extracting, based on the lane information, a lane line of a target lane after lane change of the current vehicle, and sampling the lane line of the target lane to obtain multiple second sampling points;

aligning the multiple second sampling points, and supplementing a missing point to obtain supplemented second sampling points, sampling points on a lane line in the supplemented second sampling points being corresponding to each other;

obtaining a lane center line of the target lane based on an average value of groups of aligned second sampling points in the supplemented second sampling points;

determining a vehicle landing point location of the current vehicle on the lane center line of the target lane according to a driving speed and preset lane change time of the current vehicle and the positioning location information of the current vehicle; and extending, based on a size of the current vehicle, the vehicle landing point location to a vehicle landing area corresponding to the automatic lane change state.

14. An electronic device, comprising one or more processors and a memory, the memory storing a computer program that, when being executed, causes the one or more processors to perform:

obtaining, from an automated driving domain through cross-domain communication between a cockpit domain of a current vehicle coupled to the electronic device and the automated driving domain of the current vehicle, a vehicle driving state of the current vehicle, and obtaining environment sensing information related to a current driving scene of the current vehicle, the environment sensing information comprising a scene image of the current driving scene, wherein the cockpit domain and the automated driving domain are two relatively independent processing systems, and the cross-domain communication is performed based on an in-vehicle data transmission protocol;

performing lane line detection on the scene image to obtain lane information in the current driving scene;

generating a driving-state prompt element corresponding to the vehicle driving state based on the lane information, and performing superposed fusion on the driving-state prompt element and the environment sensing information to render and generate an augmented reality map; and displaying, on a display screen of the cockpit domain, the augmented reality map, the display screen comprising at least one of an augmented reality head up screen, a dashboard screen, or a center console screen, the displaying comprising:

in response to the vehicle driving state being a manual driving state, displaying the driving-state prompt element that includes a drivable lane plane corresponding to a first lane, the first lane being a lane in which the current vehicle is currently located;

in response to the vehicle driving state being a lane center control enabled state, displaying the driving-state prompt element that includes a lane line area corresponding to the first lane;

in response to the vehicle driving state being a navigate on autopilot enabled state, displaying the driving-state prompt element that includes a lane central area corresponding to the first lane; and in response to the vehicle driving state being an automatic lane change state, displaying the driving-state prompt element that includes at least one of: a lane change route area, a target lane area after lane change, or a vehicle landing area, the vehicle landing area representing a location of the current vehicle in a target lane upon changing to the target lane.

15. The device according to claim 14, wherein the one or more processors are further configured to perform:

obtaining, through cross-domain communication between a driving domain of the current vehicle and an automated driving domain of the current vehicle, the vehicle driving state of the current vehicle from the automated driving domain.

16. The device according to claim 15, wherein the automated driving domain comprises an environment sensing device, and the one or more processors are further configured to perform:

collecting, by using the automated driving domain, sensing data measured by the environment sensing device;

transmitting the sensing data from the automated driving domain to a cockpit domain using the cross-domain communication; and determining the environment sensing information based on the sensing data obtained in the cockpit domain.

17. The device according to claim 16, wherein the one or more processors are further configured to perform:

collecting, using the cockpit domain, the scene image related to the current driving scene of the current vehicle; and performing fusion based on the scene image and the sensing data to obtain the environment sensing information.

18. The device according to claim 15, wherein the environment sensing information further comprises positioning location information of the current vehicle; and the one or more processors are further configured to perform:

rendering, in the cockpit domain based on the positioning location information of the current vehicle, other information in the environment sensing information to generate the augmented reality map used for navigation, the other information being information in the environment sensing information except the positioning location information; and superposing and drawing, in a triangulation manner, the driving-state prompt element on the augmented reality map, and highlighting the driving-state prompt element in the augmented reality map.

19. A non-transitory computer readable storage medium, comprising a computer program that, when being executed, causes an electronic device to perform:

obtaining, from an automated driving domain through cross-domain communication between a cockpit domain of a current vehicle coupled to the electronic device and the automated driving domain of the current vehicle, a vehicle driving state of the current vehicle, and obtaining environment sensing information related to a current driving scene of the current vehicle, the environment sensing information comprising a scene image of the current driving scene, wherein the cockpit domain and the automated driving domain are two relatively independent processing systems, and the cross-domain communication is performed based on an in-vehicle data transmission protocol;

performing lane line detection on the scene image to obtain lane information in the current driving scene;

generating a driving-state prompt element corresponding to the vehicle driving state based on the lane information, and performing superposed fusion on the driving-state prompt element and the environment sensing information to render and generate an augmented reality map; and displaying, on a display screen of the cockpit domain, the augmented reality map, the display screen comprising at least one of an augmented reality head up screen, a dashboard screen, or a center console screen, the displaying comprising:

in response to the vehicle driving state being a manual driving state, displaying the driving-state prompt element that includes a drivable lane plane corresponding to a first lane, the first lane being a lane in which the current vehicle is currently located;

in response to the vehicle driving state being a lane center control enabled state, displaying the driving-state prompt element that includes a lane line area corresponding to the first lane;

in response to the vehicle driving state being a navigate on autopilot enabled state, displaying the driving-state prompt element that includes a lane central area corresponding to the first lane; and in response to the vehicle driving state being an automatic lane change state, displaying the driving-state prompt element that includes at least one of: a lane change route area, a target lane area after lane change, or a vehicle landing area, the vehicle landing area representing a location of the current vehicle in a target lane upon changing to the target lane.

20. The method according to claim 1, wherein displaying the augmented reality map comprises:

displaying the augmented reality map and a standard dimension navigation figure simultaneously on the display screen.

* * * * *